(12) United States Patent
Nagatomo

(10) Patent No.: US 7,139,594 B2
(45) Date of Patent: Nov. 21, 2006

(54) METHOD AND APPARATUS FOR WIRELESS TRANSMISSION OF ELECTRONIC MAIL HAVING A MOVING IMAGE FILE ATTACHMENT WHICH IS DISPLAYED DURING EDITION OR CREATION OF ELECTRONIC MAIL

(75) Inventor: Shoichi Nagatomo, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 379 days.

(21) Appl. No.: 10/421,539

(22) Filed: Apr. 23, 2003

(65) Prior Publication Data

US 2004/0204145 A1   Oct. 14, 2004

(30) Foreign Application Priority Data

Apr. 26, 2002 (JP) ............................. 2002-125566
Mar. 20, 2003 (JP) ............................. 2003-077330

(51) Int. Cl.
*H04B 1/38* (2006.01)
(52) U.S. Cl. ................. 455/566; 455/412.1; 455/414.1
(58) Field of Classification Search ................ 455/566, 455/412.1, 414.1
See application file for complete search history.

(56) References Cited

U.S. PATENT DOCUMENTS

| 6,118,493 A * | 9/2000 | Duhault et al. ............. 348/564 |
| 6,538,665 B1 * | 3/2003 | Crow et al. ................ 715/723 |
| 6,636,729 B1 | 10/2003 | Hiramatsu et al. |
| 6,941,160 B1 * | 9/2005 | Otsuka et al. .............. 455/566 |
| 7,016,704 B1 * | 3/2006 | Pallakoff ................... 455/566 |
| 2003/0208543 A1 * | 11/2003 | Enete et al. ................ 709/206 |
| 2004/0036700 A1 * | 2/2004 | Kashio ....................... 345/660 |

FOREIGN PATENT DOCUMENTS

| JP | 2002-359695 A | 12/2002 |
| KR | 1020010058786 A | 7/2001 |

OTHER PUBLICATIONS

Seh-Joon Dokko et al.: "Development of multimedia E-mail system providing an integrated message view" High Performance Computing on the Information Superhighway, 1997. HPC Asia '97 Seoul, Suth Korea Apr. 28-May 2, 1997, Los Alamitos, CA, USA, IEEE Comput. Soc, US, Apr. 28, 1997, pp. 494-498, XP010224953, ISBN: 0-8186-7901-8.

Dokko, Seh-Joon, et al., "Development of Multimedia E-mail System Providing an Integrated Message View." High Performance Computing on the Information Superhighway, 1997, HPC Asia 1997, Seoul, South Korea, Apr. 28-May 2, 1997, 0-8186-7901-8/97, Copyright 1997 IEEE, Los Alamentos, CA, pp. 494-498.

* cited by examiner

*Primary Examiner*—Nick Corsaro
*Assistant Examiner*—Alejandro Rivero
(74) *Attorney, Agent, or Firm*—Frishauf, Holtz, Goodman & Chick, P.C.

(57) ABSTRACT

A communication apparatus comprises a memory which stores a document and a moving picture in an associated manner, a display device comprising a document display area for displaying a document and a moving picture display area for displaying a moving picture, a control unit which reads the document stored in the memory and displays the document in the document display area of the display device, and a display control unit which, when a moving picture associated with the document read by the control unit is stored in the memory, reads the moving picture associated with the document, and displays the moving picture in the moving picture display area of the display unit.

20 Claims, 33 Drawing Sheets

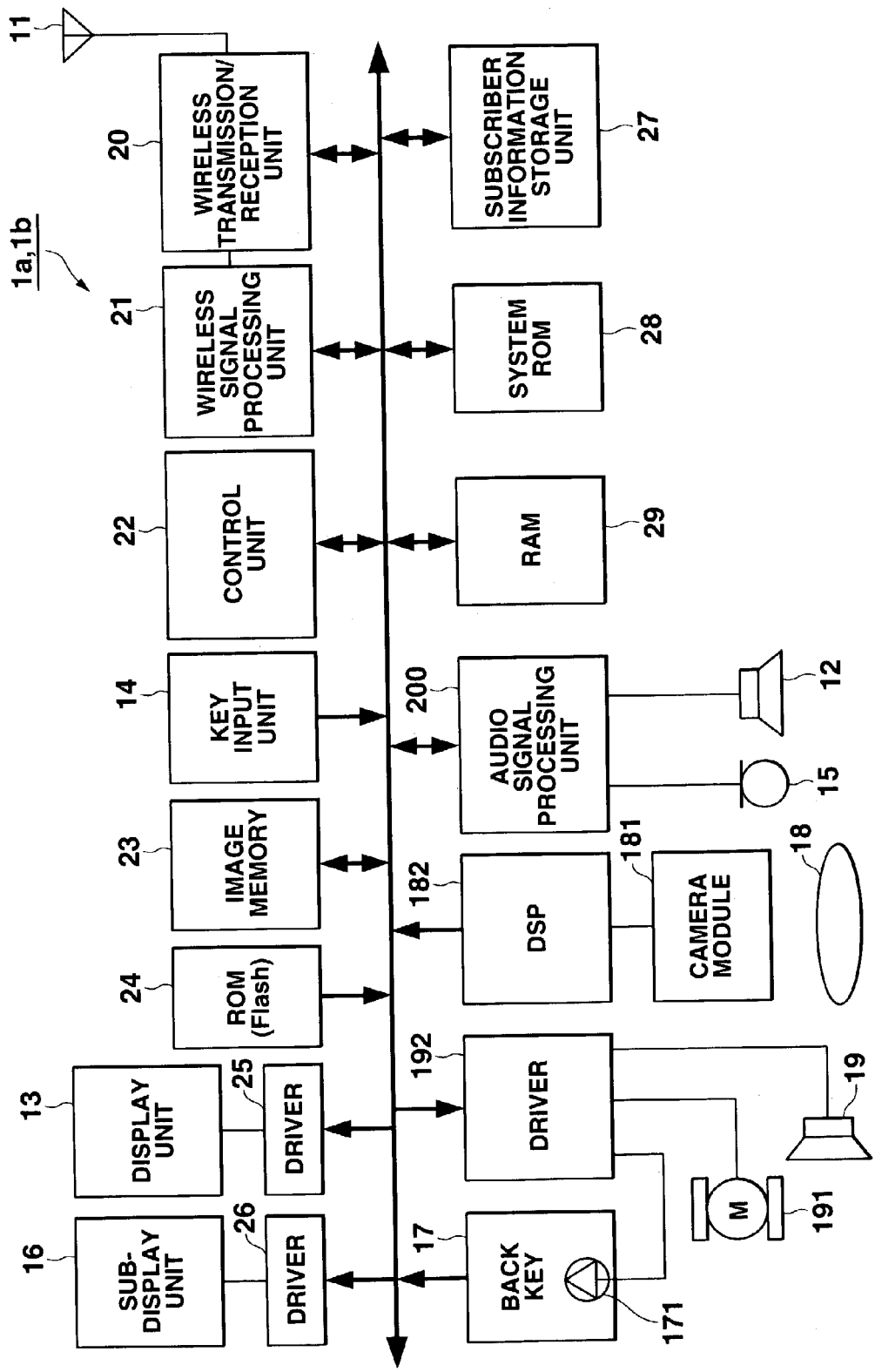

| No. | CREATION DATE/TIME | HEADER INFORMATION (INCLUDING TRANSMISSION DESTINATION ADDRESS AND SUBJECT) | E-MAIL TEXT (MESSAGE) | FLAG A | STORAGE ADDRESS | FLAG B | TRANSMISSION DATE/TIME |
|---|---|---|---|---|---|---|---|
| 001 | 2002/03/20 09:30 | aaa@mail.com/ YESTERDAY'S MATTER/... | YOU DID WELL, YESTERDAY | 0 | | | 2002/03/20 10:00 |
| 002 | 2002/04/01 09:00 | bbb@mail.com/ I FOUND!/... | I FOUND SOMETHING. IT'S THIS (ATTECHED IMAGE)? | 1 | 0001 | 1 | 2002/04/01 10:00 |
| ...... | ...... | ...... | ...... | ...... | ...... | ...... | ...... |

| No. | RECEPTION DATE/TIME | HEADER INFORMATION (INCLUDING TRANSMISSION SOURCE ADDRESS AND SUBJECT) | E-MAIL TEXT (MESSAGE) | FLAG A | STORAGE ADDRESS | FLAG C |
|---|---|---|---|---|---|---|
| 001 | 2002/03/19 13:30 | aaa@mail.com/ TODAY'S MATTER/... | GET TOGETHER AT USUAL SPOT AT 6. | 0 | / | 1 |
| 002 | 2002/04/01 10:10 | bbb@mail.com/ Re:I FOUND!/... | I FOUND! IT'S THIS. WHERE WAS IT? | 0 | / | 1 |
| ...... | ...... | ...... | ...... | ...... | ...... | ...... |

| STORAGE ADDRESS | FILE NAME | FILE ATTRIBUTE | RECORDING DATE/TIME | PROPERTY DATA |
|---|---|---|---|---|
| 0001 | 001.jpg | STILL IMAGE | 2002/04/01 | ------- |
| 0002 | 002.amc | MOVING PICTURE | 2002/04/02 | ------- |
| 0003 | 003.jpg | STILL IMAGE | 2002/04/02 | ------- |
| ------- | ------- | ------- | ------- | ------- |

296

961 962 963 964 965

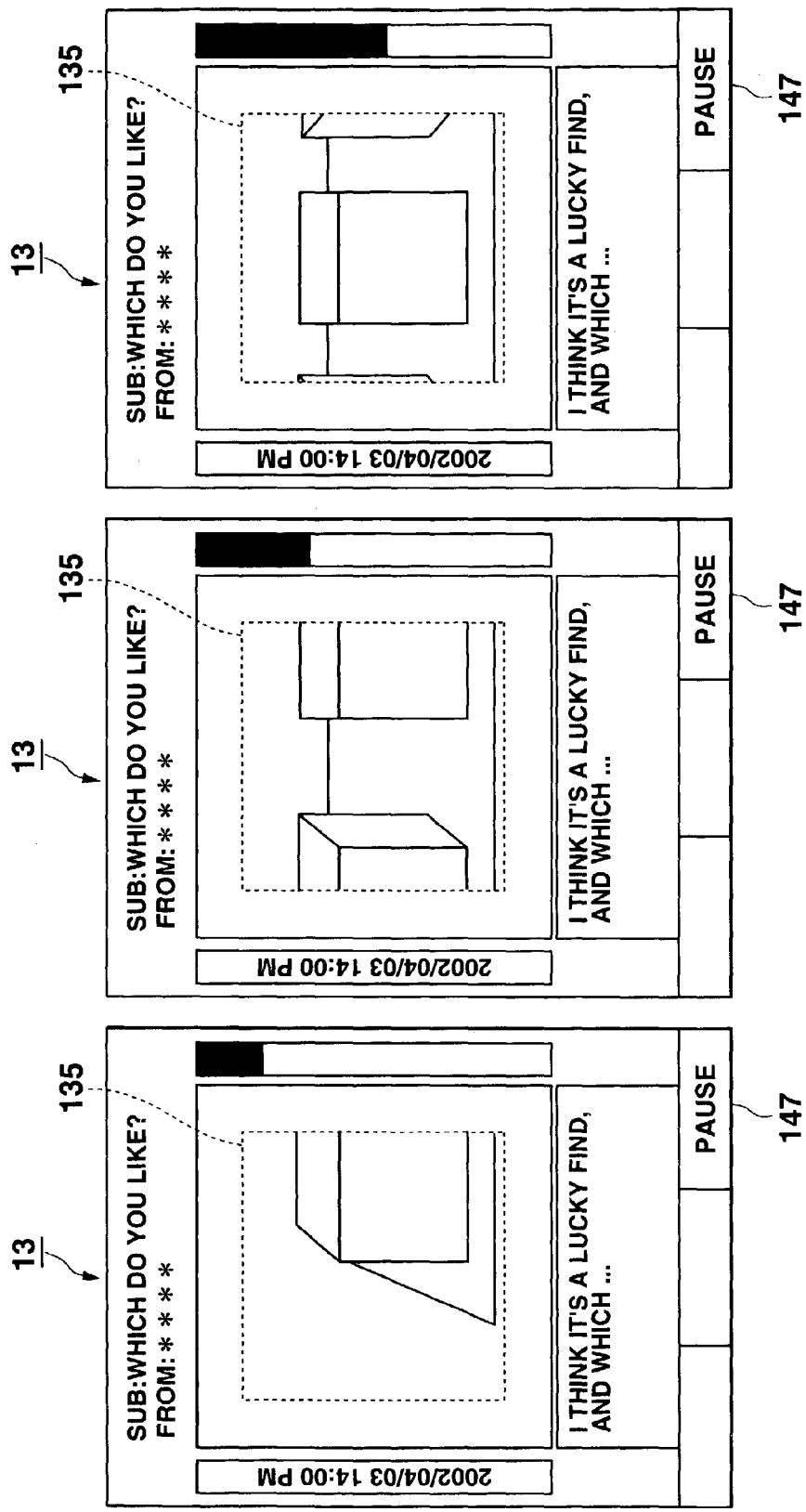

| No. | CREATION DATE/TIME | HEADER INFORMATION (INCLUDING TRANSMISSION DESTINATION ADDRESS AND SUBJECT) | E-MAIL TEXT (MESSAGE) | FLAG A | STORAGE ADDRESS | FLAG B | TRANSMISSION DATE/TIME |
|---|---|---|---|---|---|---|---|
| 001 | 2002/03/20 9:30 | aaa@mail.com/ YESTERDAY'S MATTER/... | YOU DID WELL, YESTERDAY | 0 | / | 1 | 2002/03/20 10:00 |
| 002 | 2002/04/01 9:00 | bbb@mail.com/ I FOUND!/... | I FOUND SOMETHING. IT'S THIS (ATTACHED IMAGE)? | 1 | 0001 | 1 | 2002/03/20 10:00 |
| 003 | 2002/04/03 14:00 | aaa@mail.com/ WHICH DO YOU LIKE?/... | I THINK IT'S A LUCKY FIND, AND WHICH DO YOU LIKE? PLEASE RES! | 1 | 0002 | 0 | |
| ---- | ---- | ---- | ---- | ---- | ---- | ---- | ---- |

| 931 | 932 | 933 | 934 | 935 | 936 | 937 |
|---|---|---|---|---|---|---|
| No. | RECEPTION DATE/TIME | HEADER INFORMATION (INCLUDING TRANSMISSION SOURCE ADDRESS AND SUBJECT) | E-MAIL TEXT (MESSAGE) | FLAG A | STORAGE ADDRESS | FLAG C |
| 001 | 2002/03/19 10:10 | ccc@mail.com/ YESTERDAY'S MATTER/... | YOU DID WELL, YESTERDAY | 0 | / | 1 |
| 002 | 2002/04/03 15:00 | ccc@mail.com/ WHICH DO YOU LIKE?/... | I THINK IT'S A LUCKY FIND, AND WHICH DO YOU LIKE? PLEASE RES! | 1 | 0001 | 1 |
| ---- | ---- | ---- | ---- | ---- | ---- | ---- |

938

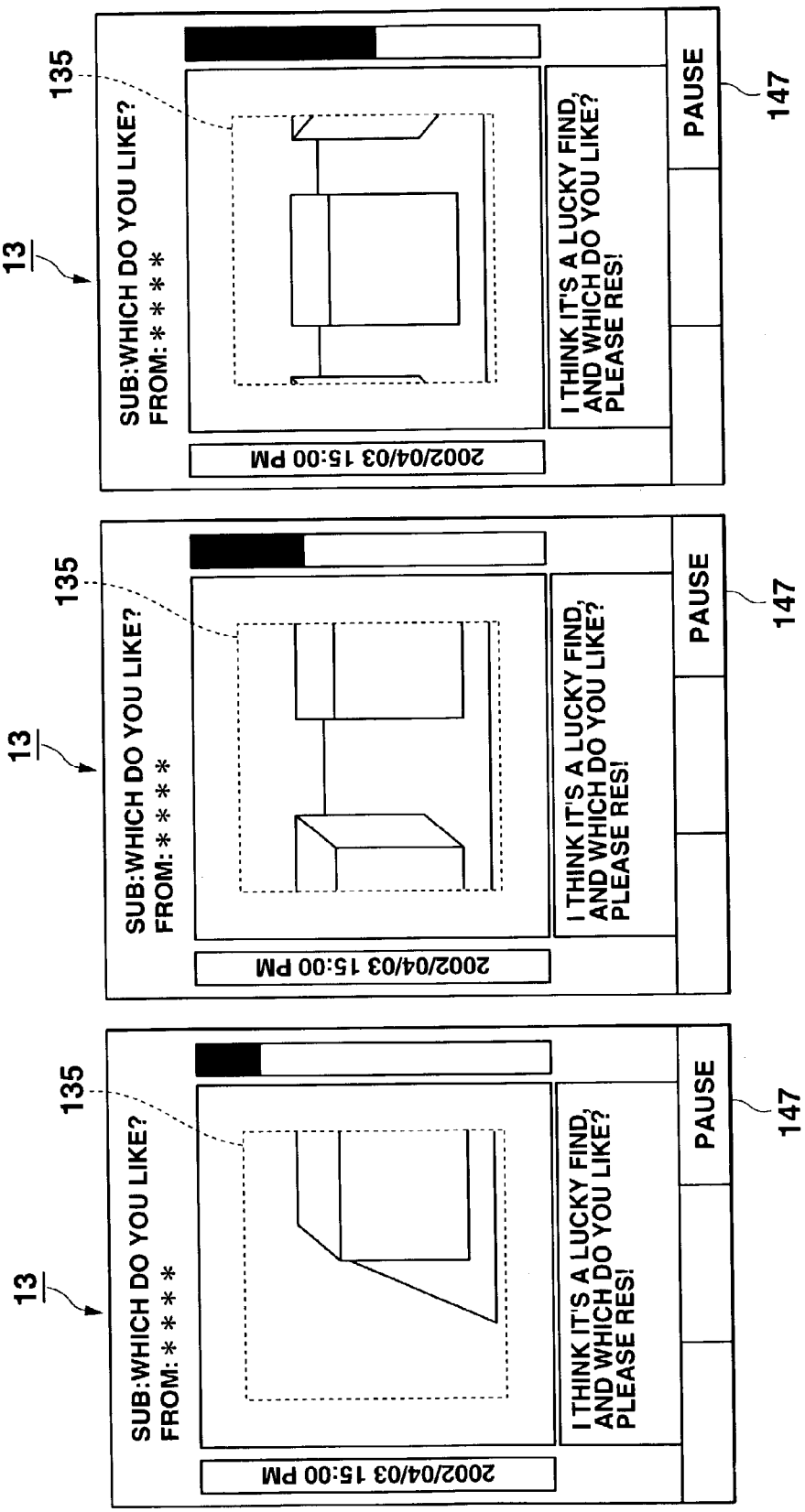

METHOD AND APPARATUS FOR WIRELESS TRANSMISSION OF ELECTRONIC MAIL HAVING A MOVING IMAGE FILE ATTACHMENT WHICH IS DISPLAYED DURING EDITION OR CREATION OF ELECTRONIC MAIL

CROSS-REFERENCE TO RELATED APPLICATIONS

This application is based upon and claims the benefit of priority from the prior Japanese Patent Applications No. 2002-125566, filed Apr. 26, 2002; and No. 2003-077330, filed Mar. 20, 2003, the entire contents of both of which are incorporated herein by reference.

BACKGROUND OF THE INVENTION

1. Field of the Invention

The present invention relates to a communication apparatus, a communication system, a display method, and a program which are applied to an electronic mail system and the like.

2. Description of the Related Art

Conventionally, there have been present systems for exchanging electronic mails to which various files are attached. In recent years, as disclosed in Jpn. Pat. Appln. KOKAI Publication No. 2002-359695, a user uses a wireless communication terminal such as a cellular phone with an image pickup function to attach a picked-up image (or URL where an image is stored) to an e-mail to be transmitted, and transmits the e-mail to a wireless communication terminal at a transmission destination, where the transmitted e-mail text and the attached image are displayed at the wireless communication terminal at a reception side.

However, in the above method, in the case of attaching a moving picture file to an e-mail and transmitting the e-mail, it was so difficult for the user to create, edit, and read the e-mail while confirming reproduced contents of the moving picture file.

BRIEF SUMMARY OF THE INVENTION

It is an object of the present invention to provide a communication apparatus, a communication system, a display method, and a program by which a user can confirm reproduced contents of an e-mail text and a moving picture file attached to the e-mail on the same screen.

According to an embodiment of the present invention, a communication apparatus comprises a memory which stores a document and a moving picture in an associated manner; a display device comprising a document display area for displaying a document and a moving picture display area for displaying a moving picture; a control unit which reads the document stored in the memory and displays the document in the document display area of the display device; and a display control unit which, when a moving picture associated with the document read by the control unit is stored in the memory, reads the moving picture associated with the document, and displays the moving picture in the moving picture display area of the display unit.

According to an embodiment of the present invention, a communication system comprises a transmission device; and a reception device, wherein the transmission device comprises a first display unit comprising a first document display area for displaying a document and a first moving picture display area for displaying a moving picture in a same screen; a moving picture memory for storing a moving picture; a document creating unit; a first display control unit which displays a document being created by the creating unit in the first document display area, and, when a moving picture is stored in the moving picture memory in association with the document, reads the moving picture and displays the moving picture in the first moving picture display area; and a transmitting unit which transmits a document created by the creating unit and a moving picture associated with the document by wireless, and the reception device comprises a second display unit comprising a second document display area for displaying a document and a second moving picture display area for displaying a moving picture in a same screen; a receiver which receives the document and the moving picture transmitted by the transmission device; a memory which stores the document and the moving picture received by the receiver in an associated manner; a control unit which reads the document stored in the memory and displays the document in the second document display area of the second display unit; and a second display control unit which, when a moving picture associated with the document read by the control unit is stored in the memory, reads the moving picture associated with the document, and displays the moving picture in the second moving picture display area of the second display unit.

According to an embodiment of the present invention, a display method for a communication apparatus comprising a display unit comprising a document display area for displaying a document and a moving picture display area for displaying a moving picture, a memory which stores a document and a moving picture in an associated manner, and a communication device which transmits and receives a document and a moving picture, the method comprises reading the document stored in the memory and displaying the document in the document display area; and when a moving picture associated with the read document is stored in the memory, read the moving picture, and display the moving picture in the moving picture display area.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 3 is a block diagram showing a configuration of the cellular phone 1a, 1b;

FIG. 5C is a diagram showing stored contents of a transmission e-mail data storage area 2921 of the cellular phone 1a;

FIG. 5D is a diagram showing stored contents of a reception e-mail data storage area 2922 of the cellular phone 1*a*;

FIG. 5E is a diagram showing stored contents of an image memory management table 296 of the cellular phone 1*a*;

FIGS. 15A, 15B, and 15C are schematic diagrams showing one example of the display screen during reproducing a moving picture;

FIG. 16B is a diagram showing a storage status of the transmission e-mail data storage area 2921 in step S116 in FIG. 12;

FIG. 18 is a diagram showing a storage status of the reception e-mail data storage area 2922 in the cellular phone 1*b*;

FIGS. 19A, 19B, 19C, 19D, and 19E are schematic diagrams showing one example of the display screen when a moving picture in a received e-mail with a moving picture file is being reproduced;

DETAILED DESCRIPTION OF THE INVENTION

Figure 1:
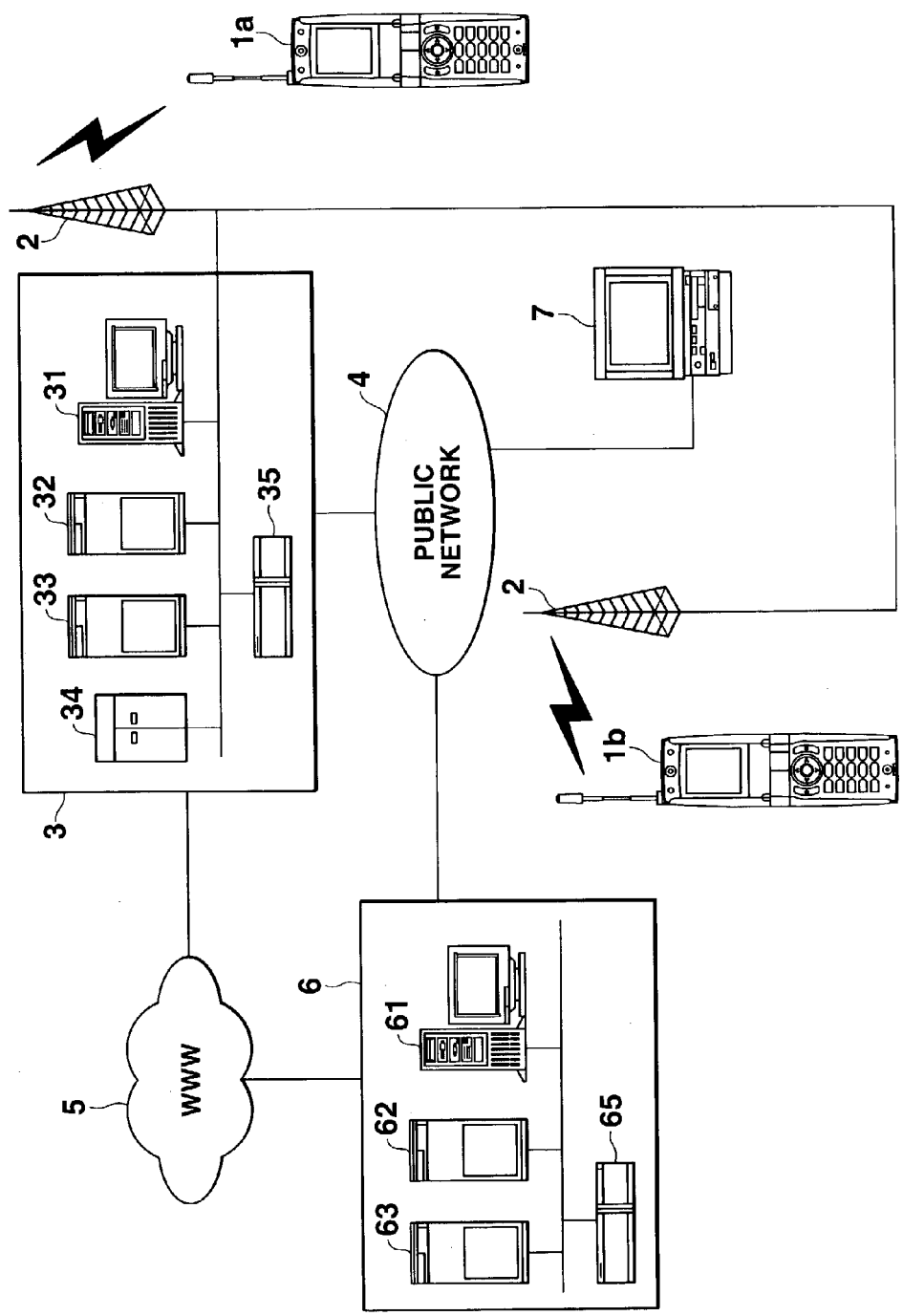
FIG. 1 is a block diagram showing a configuration of an e-mail transmission/reception system according to a first embodiment of the present invention.

An embodiment of a communication apparatus, a communication system, a display method, and a program according to the present invention will now be described with reference to the accompanying drawings.

First Embodiment

Hereinafter, a case where the present invention is applied to a cellular phone with an image pickup function will be described as a first embodiment with reference to the drawing.

A-1. Configuration of the Embodiment

FIG. 1 is a block diagram showing a system configuration of an e-mail transmission/reception system to which the present invention is applied. A cellular phone (wireless communication terminal/data communication apparatus) 1*a*, 1*b* has an image pickup function, an image memory, a function of transmitting a moving picture stored in the image memory to a system, particularly to an e-mail server 33, 63 described later, and a function of receiving an e-mail to which a moving picture file is attached. When an e-mail with a moving picture file is created in the cellular phone 1*a*, the e-mail text and the moving picture file attached to the e-mail text are displayed so that both can be confirmed on the same screen. On the other hand, when the received e-mail is displayed in the cellular phone 1*b* which receives the e-mail, reproduced contents of the e-mail text and the moving picture file are displayed on the same screen.

Base stations 2, 2 are wirelessly connected to a communication service provider (including Internet provider) 3 to which users of the cellular phones 1a and 1*b* subscribe.

The communication service provider (including Internet provider) 3 comprises a Web server 32 configuring a system for connecting to WWW (World Wide Web) 5 described later, a router 35, and an e-mail server 33 configuring an e-mail system in addition to an exchanger 34 required for a cellular phone service which is provided as a main service. Further, there is provided a function of connecting the cellular phones 1*a* and 1*b* to WWW 5 with the radio stations 2 as access points.

A public network 4 is an analog telephone network or digital telephone network. WWW 5 is the so-called Internet.

An Internet service provider 6 has the same configuration as that of the communication service provider 3 excluding the exchanger 34, and comprises systems (expediently, a Web server 62 and a router 65) for connecting to WWW 5 and an e-mail system (e-mail server 63). A personal computer 7 comprises a function of connecting to WWW 5 via the public network 4 and the Internet service provider 6 for transmitting/receiving e-mails.

In addition, as the characteristics of the first embodiment, when an e-mail with a moving picture file is exchanged between the cellular phones 1*a* and 1*b*, the e-mail text and the moving picture are displayed on one screen (described later in detail). But when the e-mail with a moving picture file is transmitted from the cellular phone 1*a* (or 1*b*) to the personal computer 7, the e-mail text and the moving picture file are treated as a moving picture file attached to a normal e-mail. In other words, an e-mail software program according to the first embodiment is compatible with an e-mail software program generally operating in a personal computer.

Figure 2A:
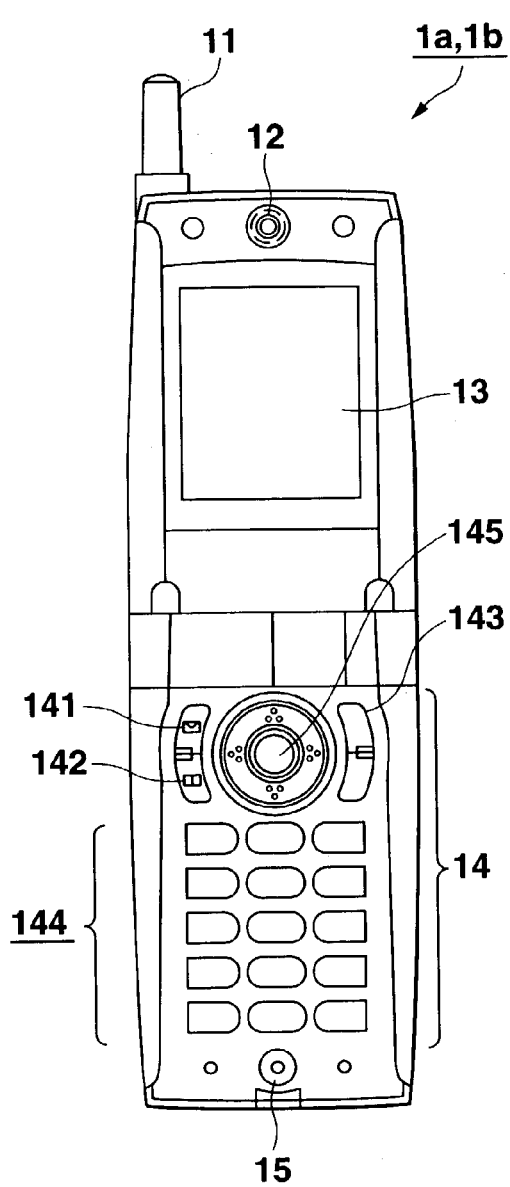
FIGS. 2A and 2B are appearance views (opened state: front view and back view) of a cellular phone 1a, 1b in FIG. 1.
Figure 2B:
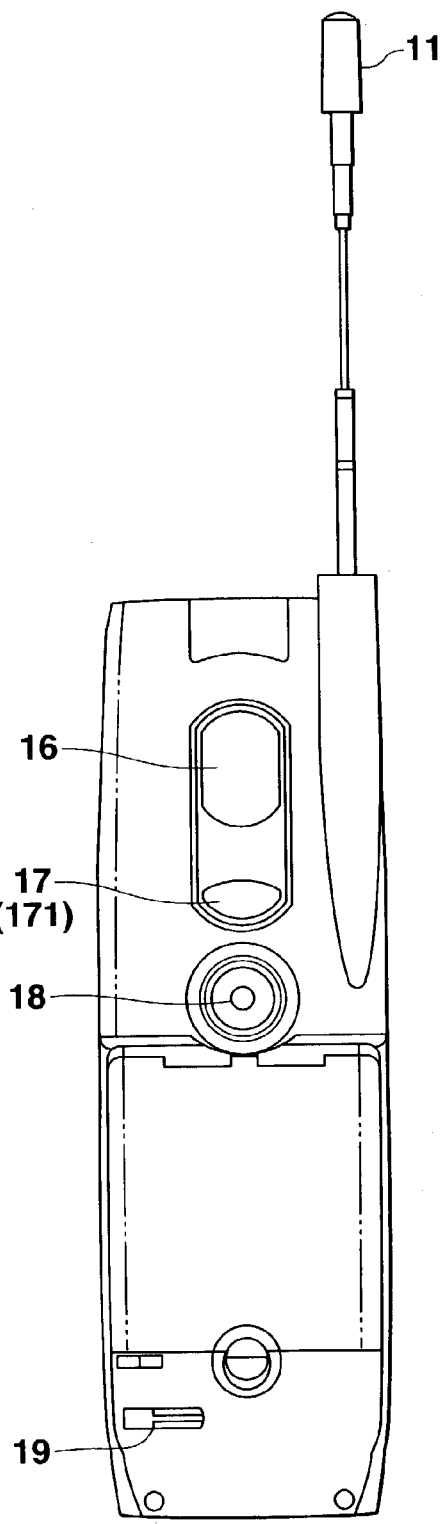

FIGS. 2A and 2B are appearance views (opened state: front view and back view) of the cellular phone 1*a*, 1*b*. The cellular phone 1*a*, 1*b* has a folding type structure comprising a cover portion and a main body portion. An antenna 11 is a whip antenna for transmitting/receiving a radio wave modulated in the CDMA (Code Division Multiple Access) method in the frequency band of 800 MHz to 1.9 GHz, and is a telescopic antenna provided at the back of the cover portion. A speaker 12 is provided at the front side of the cover portion to perform audio outputting. A display unit (main display unit) 13 comprises a color liquid crystal device of 120 dots (width)×160 dots (height). The display unit 13 has resolution corresponding to the QVGA (Quarter Video Graphics Array) capable of simultaneously displaying both an image and an e-mail text in the e-mail with an image.

A key operation unit 14 is provided at the front of the main body portion, and comprises various keys (e-mail key 141, address key 142, function key 143), numeric keys 144, a shutter key 145, and the like. The e-mail key 141 is directed for activating an e-mail function and displaying an e-mail menu. The address key 142 is directed for opening an address book used when selecting an e-mail address of a transmission destination. The function key 143 is directed for instructing reproduction/display or suspension of a moving picture file when creating an e-mail with a moving picture file or confirming the e-mail. The numeric keys 144 are used for inputting a phone number or characters. The shutter key 145 is directed for starting moving picture pickup in response to the detection of pressing maintaining for predetermined seconds (about 2 seconds) by a user in a camera mode.

A microphone 15 is provided at the lower portion of the main body portion, and is directed for performing audio inputting. The captured image data is accumulated in an image data buffer area 295 until the moving picture pickup is terminated or a predetermined capacity (100K bytes at the maximum) is exceeded. Then the data is converted to a compressed file to be stored in an image memory 23 when it is detected that the data is accumulated to the predetermined capacity or that the pressing maintaining is released.

A sub-display unit 16 is provided at the back of the cover portion. A back key 17 is made of transparent or semitransparent material and incorporates an LED 171 which emits a light at call incoming. An image pickup lens 18 is provided at the back of the cover portion, that is at the lower portion of the sub-display unit 16. An annunciation speaker 19 is directed for announcing call incoming and the like, and is provided at the back of the main body portion such that an annunciation sound can be heard even in the state where the cover portion is closed on the main body portion.

FIG. 3 is a block diagram showing a configuration of the cellular phone 1a, 1b. A wireless transmission/reception unit 20 is directed for transmitting/receiving audio or data (e-mail data) wirelessly received via the antenna 11 to modulate/demodulate the same. A wireless signal processing unit 21 is directed for demodulating the audio or data (e-mail data) received in the wireless transmission/reception unit 20 or performing processing required for the wireless communication such as modulating of the audio or data to be transmitted to the wireless transmission/reception unit 20. A control unit 22 is directed for controlling various operations or the entire operation.

The image memory 23 is a memory for storing an image file picked up in a camera unit (image pickup lens 18, camera module 181, DSP 182) and compression-encoded by a program stored in an image processing program area 2413, or an image file downloaded via WWW 5. A ROM 24 comprises a programmable ROM (flash memory) and stores various programs specific to the present embodiment described later therein.

A driver 25 comprises a buffer corresponding to a display area of the display unit 13 and is directed for driving the display unit 13. A driver 26 is directed for driving the subdisplay unit 16. A subscriber information storage unit 27 stores profile data such as a phone number for calling the cellular phone 1, an operator's (subscriber's) ID, an e-mail address, and the like therein. A ROM 28 stores various programs for controlling the control unit 22 therein. A RAM 29 stores various data required as a wireless communication terminal, data required for operation of the control unit 22, and email data therein. Specifically, according to the first embodiment, a storage area for buffering a moving picture being picked up one time in the camera mode is provided in the RAM 29.

An audio signal processing unit 200 is directed for performing encode processing of an audio signal input from the microphone 15, or driving the speaker 12 by decoding on the basis of the signal output from the wireless signal processing unit 21 to output audio. The camera module 181 comprises a CCD or CMOS to capture color images. The DSP 182 performs encode-processing of the images captured in the camera module 181. An annunciation driver 192 is a driver for driving the annunciation speaker 19, a vibrator 191, and the LED 171.

Figure 4:
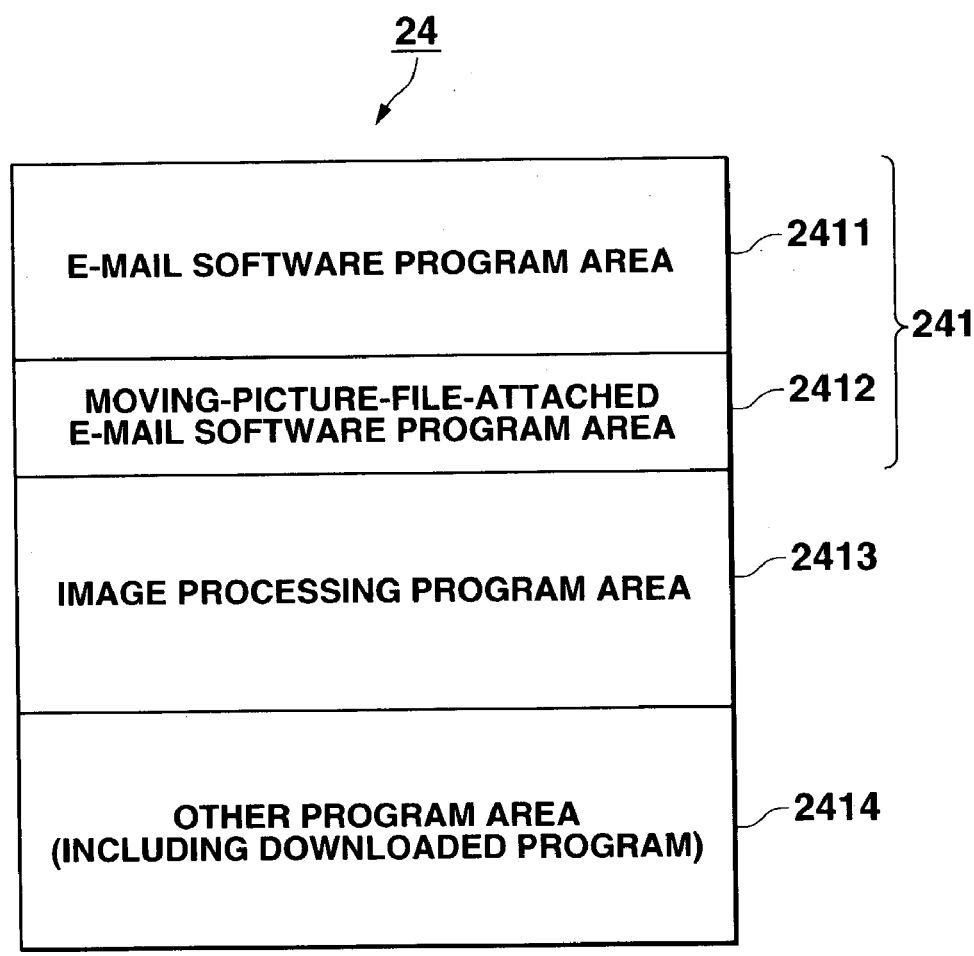
FIG. 4 is a conceptual diagram showing a configuration of a memory area of a ROM 24 of the cellular phone 1a, 1b.

FIG. 4 is a conceptual diagram showing a configuration of a memory area of the ROM 24 of the cellular phone 1a, 1b. The ROM 24 stores software programs specific to the first embodiment therein. The ROM 24 comprises an e-mail software program area 241, an image processing program area 2413, and other program area 2414.

The e-mail software program area 241 is divided into an area 2411 for storing a conventional e-mail software program therein and an area 2412 for storing a software program activated when an e-mail with a moving picture file is created and confirmed therein. The e-mail software program stored in the area 2412 may be downloaded from WWW 5 via the Internet service provider 6 to be stored.

The image processing program area 2413 stores an image processing program for performing compression-encoding by the JPEG method and filing of moving picture data which is picked up and digitally encoded in the image pickup unit (image pickup lens 18, camera module 181, DSP 182) and buffered in the RAM 29 therein when the data converted to an compressed file by the encode-compression processing conformable to MPEG-4 method or buffered is a still image. Further, the image processing program changes and displays the display size on 96×80 pixels during display and on 128×96 pixels (Sub-QCIF size) during stop (suspension) when the moving picture file is reproduced and displayed.

This is because it is assumed the case where some communication service providers impose a limitation on a moving picture file which an individual can attach to an e-mail. When a moving picture file attached to an e-mail is reproduced and displayed, the file is reproduced and displayed on 96×80 pixels. On the other hand, in the case where the moving picture file transmitted from the communication service provider is reproduced and displayed or where the moving picture file is reproduced and displayed when suspension is detected during reproducing and displaying the moving picture file attached to the e-mail, the moving picture file is displayed on 128×96 pixels. This is because even the moving picture file attached to the e-mail can be easily viewed by displaying in an enlarged manner by the suspension detection.

The first embodiment is configured so that the moving picture file attached to the e-mail and the moving picture file through moving picture distribution are different in reproduction size, but the present invention is not limited thereto and the reproduction/display size may be varied according to various embodiments.

The other program area 2414 stores application software programs other than the above programs therein.

Figure 5A:
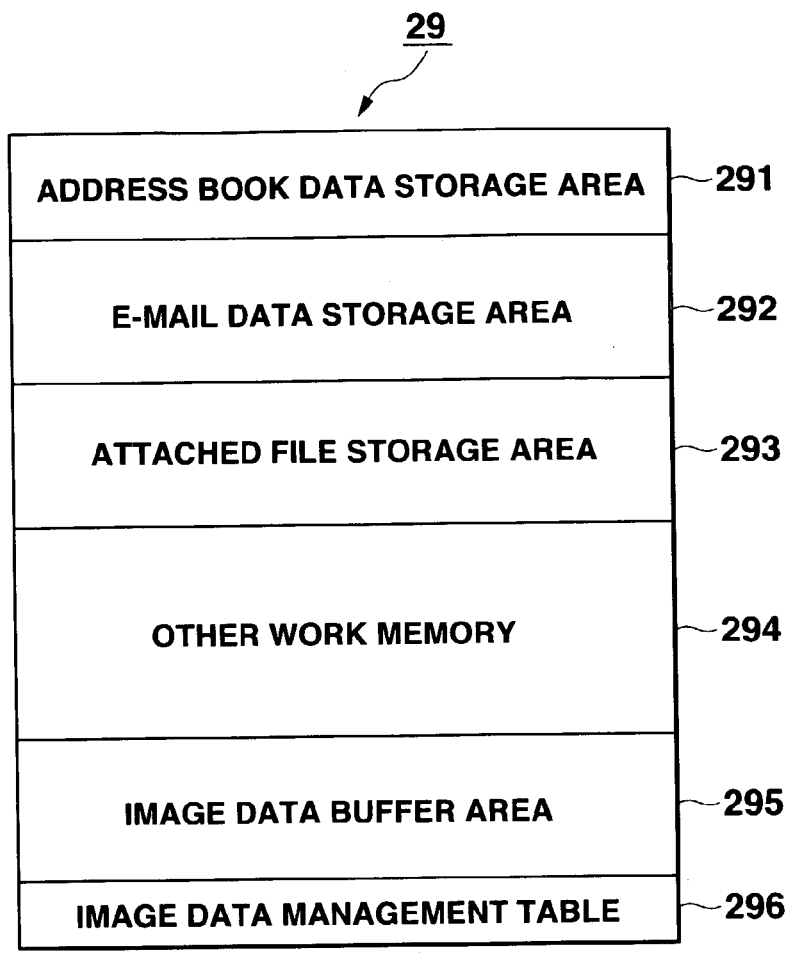
FIG. 5A is a conceptual diagram showing a configuration of a memory area of a RAM 29 of the cellular phone 1a, 1b.
Figure 5B:
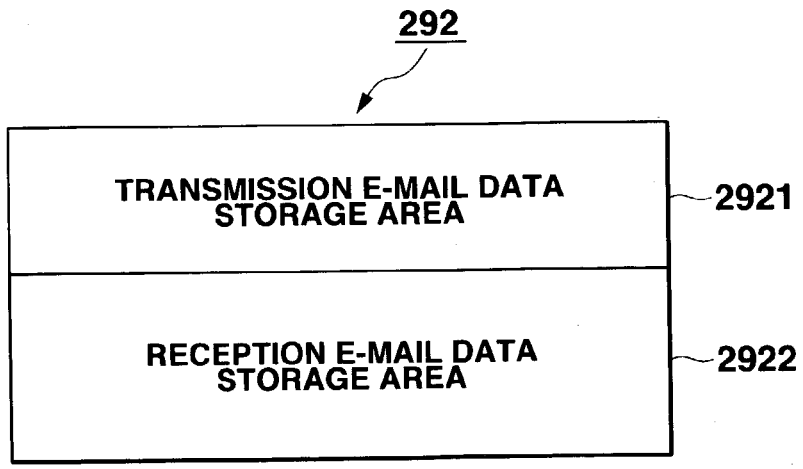
FIG. 5B is a conceptual diagram showing a configuration of a memory area of an e-mail data storage area 292.

FIG. 5A is a conceptual diagram showing a configuration of a memory area of the RAM 29 of the cellular phone 1*a*, 1*b*. The RAM 29 comprises an address book data storage area 291, an e-mail data storage area 292, an attached file storage area 293, other work memory 294, an image data buffer area 295, and an image data management table 296. The address book data storage area 291 stores a plurality of sets of records with a name, a phone number, an e-mail address, and the like as one set of records therein. The e-mail data storage area 292 comprises a transmission e-mail data storage area 2921 and a reception e-mail data storage area 2922 as shown in FIG. 5B, and stores e-mail data created/transmitted or received using the e-mail software program of the present invention.

FIG. 5C is a diagram showing stored contents of the transmission e-mail data storage area 2921 in the cellular phone 1*a*, where an e-mail creation date/time area 922, an e-mail header information (including a an e-mail address of a transmission destination and a subject) area 923, an e-mail text (message) area 924, a flag "A" area 925 where a flag indicating whether or not a still image file or moving picture file is attached to an e-mail text is stored, a storage address area 926 of a corresponding file in the image memory 23 where an entity of the file to be attached is stored, a flag "B" area 927 where a flag indicating whether or not the e-mail is already transmitted is stored, and a transmission date/time area 928 of the e-mail are corresponded respectively, and a record No. 921 is assigned thereto as one record to be stored.

FIG. 5D is a diagram showing stored contents of the reception e-mail data storage area 2922 in the cellular phone 1*a*, where an e-mail reception date/time area 932, an e-mail header information (including an e-mail address of a transmission source and a subject) area 933, an e-mail text (message) area 934, a flag "A" area 935 where a flag indicating whether or not a still image file or moving picture file is attached to the received e-mail text is stored, a storage address area 936 of a corresponding file in the attached file storage area 293 where an entity of the attached file is stored, and a flag "C" area 937 where a flag indicating whether or not the e-mail is already displayed and confirmed is stored are corresponded respectively, and a record No. 931 is assigned thereto as one record to be stored. When a file is attached to an e-mail, the attached file storage area 293 stores this file therein. The other work memory 294 stores various data as other work memory therein. The image data buffer area 295 is a storage area for buffering a moving picture being picked up one time. The image data management table 296 comprises the contents as shown in FIG. 5E, and stores a plurality of sets of records with a storage address, a file name, a file attribute of a still image or moving picture, a recording date/time, creator information of an image file stored in the image memory 23, and property data of the file as one set of records.

A-2. Operation of the Embodiment

An operation of the aforementioned first embodiment will be described.

(1) Camera Mode

Figure 6:
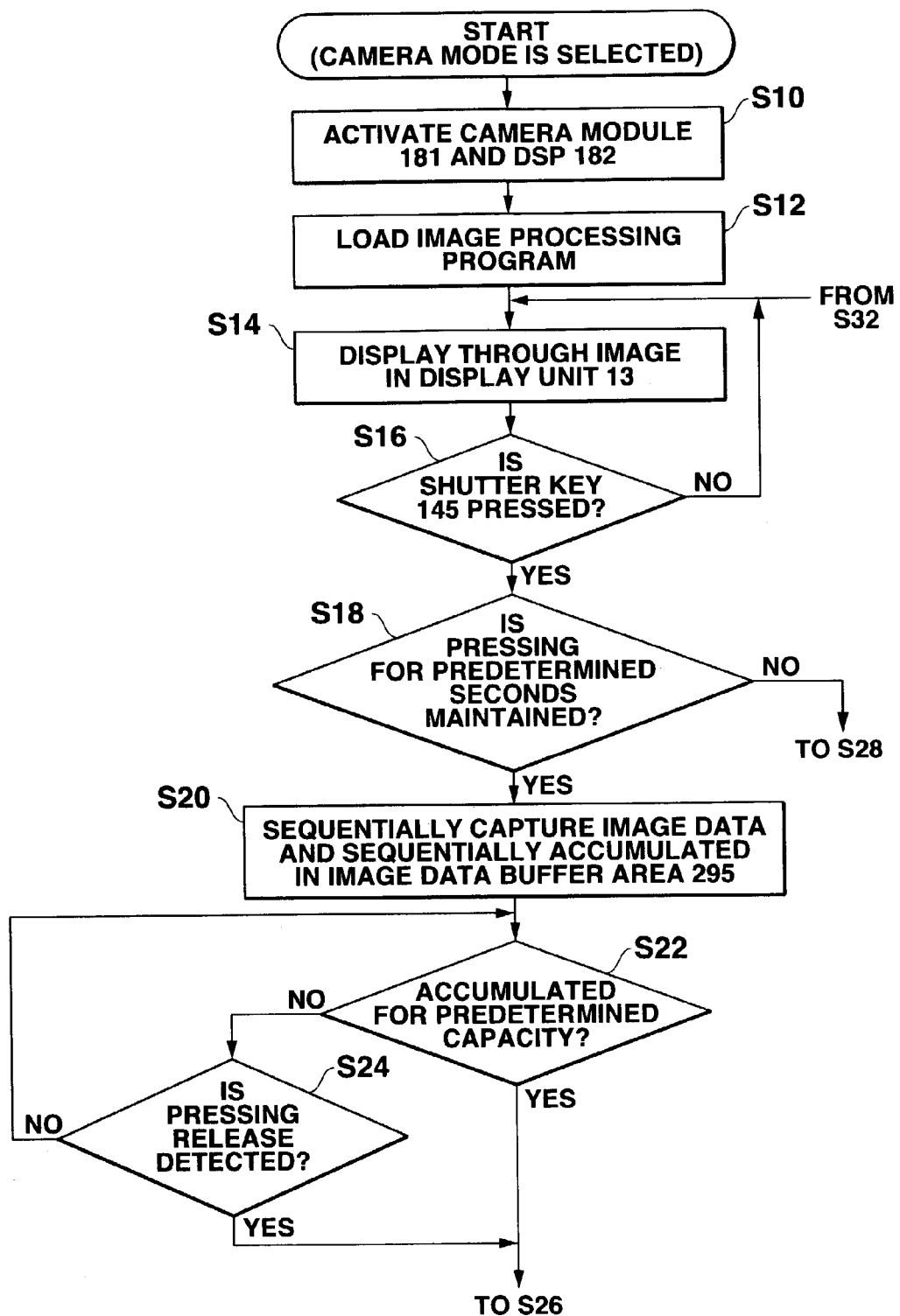
FIG. 6 is a flow chart for explaining an operation in a camera mode according to the first embodiment.
Figure 7:
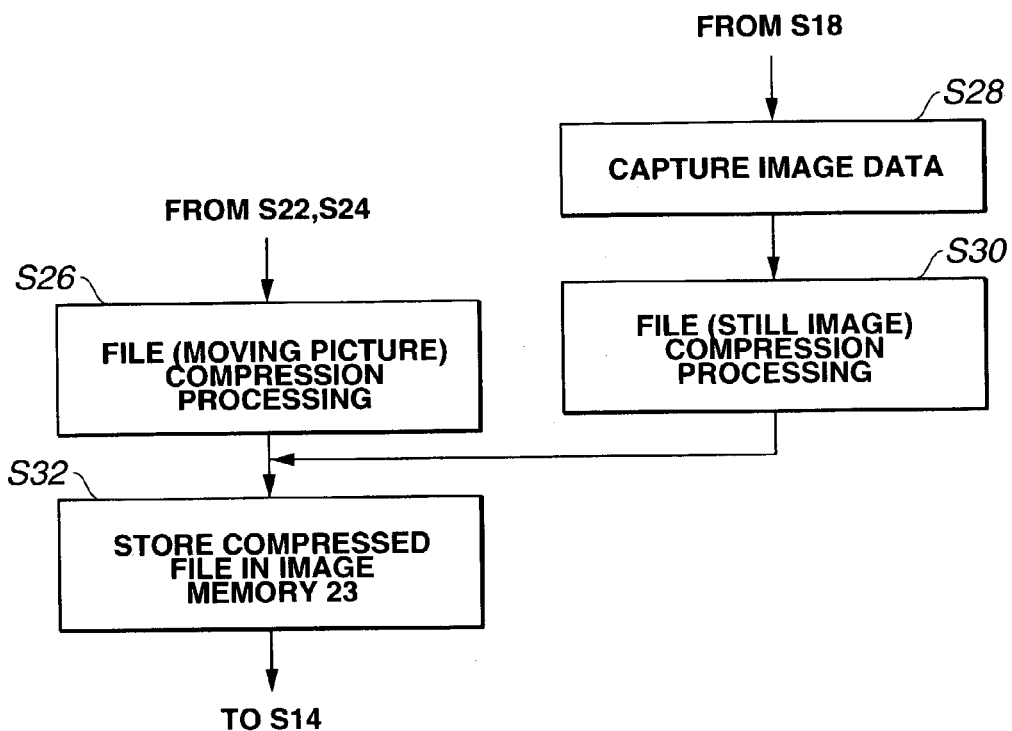
FIG. 7 is a flow chart for explaining the operation in the camera mode according to the first embodiment.

An operation in the camera mode according to the first embodiment will be described. FIGS. 6 and 7 are flow charts for explaining the operation in the camera mode according to the first embodiment.

When the camera mode is selected by the user, the camera module 181 and the DSP 182 are activated (step S10). The image processing program is loaded (step S12), and a through image is displayed on the display unit 13 (step S14). It is determined whether or not the shutter key 145 is pressed (step S16). When the shutter key 145 is not pressed, the processing returns to step S14, where the through image is continued to display.

When the shutter key 145 is pressed, it is determined whether or not the pressing is maintained for predetermined seconds (about 2 seconds) (step S18). When the shutter key 145 is being pressed for the predetermined seconds, the image data is sequentially captured to be sequentially accumulated in the image data buffer area 295 (step S20).

Figure 8:
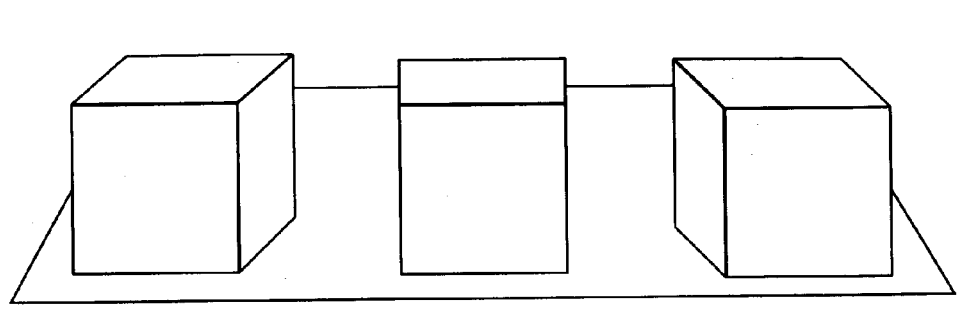
FIG. 8 is a schematic diagram showing how to pick up an object in the camera mode.

FIG. 8 is a schematic diagram showing how an object is picked up in the camera mode. In the illustrated example, image pickup is performed while moving the object in the direction shown by an arrow. In the process of capturing the image data, it is determined whether or not a predetermined capacity (for example, 100K bytes) of data is accumulated (step S22). When the predetermined capacity of data is not accumulated, it is determined whether or not the pressing of the shutter key 145 is released (step S24). When the predetermined capacity is not reached (No in step S22) and the pressing of the shutter key 145 is not released (No in step S24), the processing returns to step S22, where the image data is continued to accumulate in the image data buffer area 295.

When the predetermined capacity is reached (Yes in step S22) or the pressing of the shutter key 145 is released (Yes in step S24), the image data accumulated in the image data buffer area 295, i.e., a moving picture file is converted to a compressed file (step S26). The moving picture file converted to the compressed file is added with a file name on the basis of a time stamp to be stored in the image memory 23 (step S32), and the processing returns to step S14, where the above processing is continued.

In step S18, when the shutter key 145 is not pressed for the predetermined seconds, that is when the shutter key 145 is pressed for a moment (not more than 2 seconds), the image data is captured (step S28), and a still picture is converted to a compressed file (step S30). The still picture file converted to the compressed file is added with a file name on the basis of the time stamp to be stored in the image memory 23 (step S32), and the processing returns to step S14, where the above processing is continued.

In this manner, in the camera mode, when the pressing operation/release of the shutter key 145 is detected within the predetermined time, the image captured in the camera module at that time is converted into a compressed file as a still image, while when the pressing of the shutter key 145 is detected over the predetermined time, the images captured from the start of the pressing are sequentially accumulated in the image data buffer area 295 (moving picture). When the predetermined capacity (100K bytes) is exceeded or when the pressing release of the shutter key 145 is detected, the moving picture pickup is stopped and compressed.

FIG. 5E shows that the moving picture file picked up through the above operation is stored in a storage address "0002" of the image memory 23. In other words, the file name of the moving picture file stored in the storage address "0002" is 002.amc, and "moving picture" as a file attribute, "2002/04/02" as a recording date/time, "image pickup conditions such as zoom, exposure" as property data (omitted in the drawing) are stored.

The extension of "amc" indicates a file format conformable to the video encode format of ISO MPEG-4 Simple Profile Level 1.

(2) E-mail (Message) Creation

An operation of e-mail creation according to the first embodiment will be described. FIGS. 9 to 12 are flow charts for explaining the operation of e-mail creation in the cellular phone according to the first embodiment.

When an e-mail creation mode is selected by the user, an e-mail menu is displayed (step S40). It is determined whether or not new creation is selected from the e-mail menu (step S42). When the new creation is not selected, it is determined whether or not a reception box is selected (step S44). When the reception box is not selected, the processing proceeds to other processing (step S46). A processing when the reception box is selected, that is a processing for displaying a received e-mail will be described later with reference to FIG. 17.

When the new creation is selected from the e-mail menu, a creation menu is displayed (step S48). It is determined whether or not an e-mail with a moving picture file is selected from the e-mail menu (step S50). When the e-mail with a moving picture file is not selected, the processing proceeds to a normal e-mail processing (step S52).

When the e-mail with a moving picture file is selected from the e-mail menu, the e-mail program with the moving picture file and the image processing program are loaded (step S54), and a creation screen is displayed (step S56).

It is determined whether or not any one item of "image selection", "e-mail creation/edition", or "save/exit" is selected in the creation screen (step S58). When "image selection" is selected, an image file is retrieved (step S60). It is determined whether or not the moving picture file is present (step S62). When the moving picture file is not present, an error message is displayed (step S64) and the processing returns to the creation screen display in step S56 shown in FIG. 9.

When the moving picture file is present, the moving picture file (still image at the start of image pickup) is displayed in an album form (step S66). It is determined whether or not any moving picture file is selected from the album display (step S68). When the moving picture file is not selected, the processing returns to step S66, where the album display is continued.

When any moving picture file is selected, the selected moving picture file is resized to Sub-QCIF size (128×96 pixels) (step S70), and the still image is displayed (step S72). Thereafter, the processing returns to the creation screen display in step S56.

Figure 13:
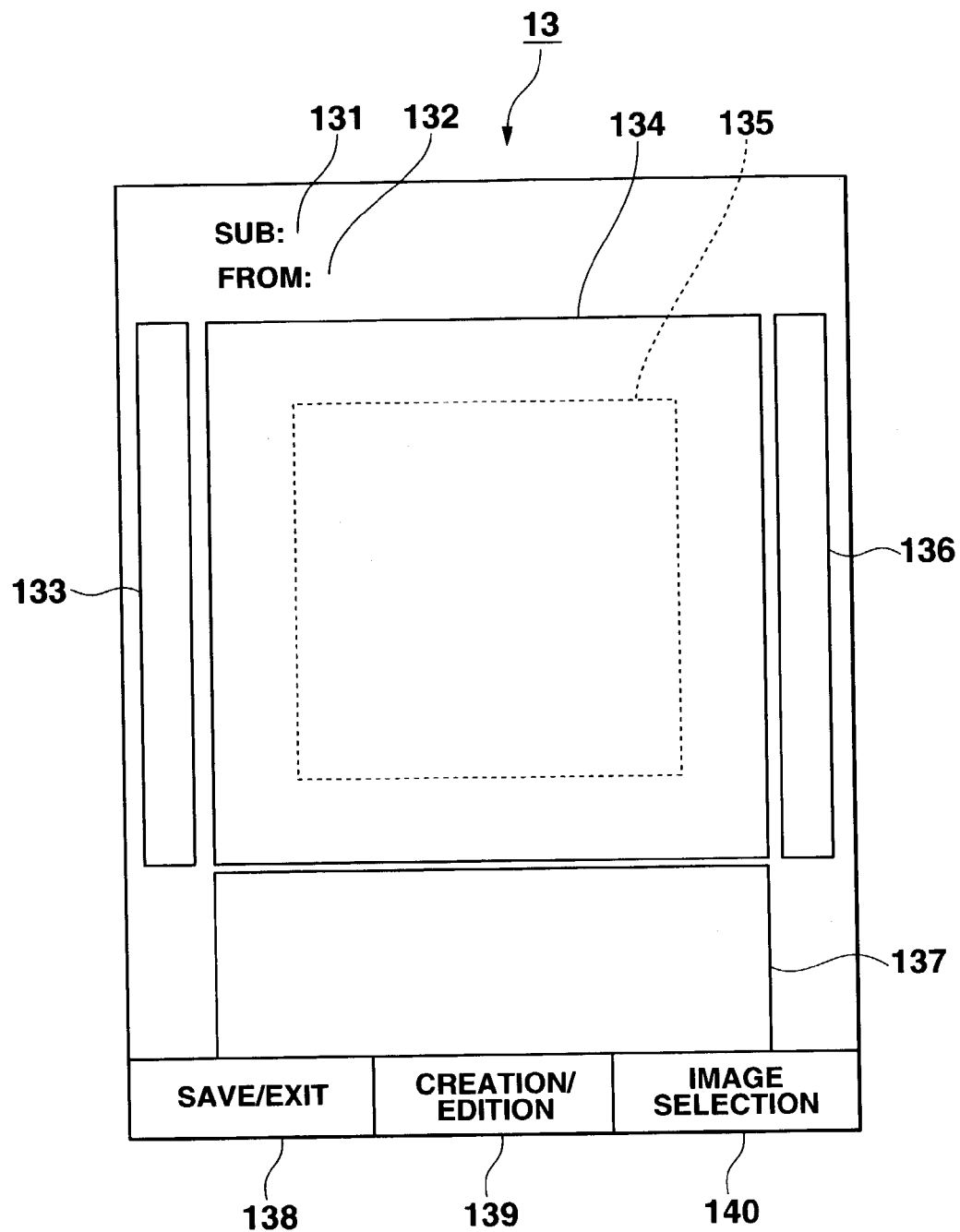
FIG. 13 is a schematic diagram showing a display screen when "e-mail creation/edition" is selected.

When "e-mail creation/edition" menu is selected in the creation screen, a screen for performing "creation/edition" is displayed (step S80). FIG. 13 is a schematic diagram showing a display screen when "e-mail creation/edition" is selected. In the drawing, a title included in the e-mail header information is displayed in a Subject area 131. An e-mail transmitter's name is displayed in a "From" area 132. A creation date/time of the attached moving picture file is displayed in a date/time display area 133. In addition, the creation date/time may be changed to reception date/time, current date/time, or the like through a predetermined key operation.

A display area 134 has the size of 128×96 pixels (Sub-QCIF size), and is an area for displaying the suspended state of the reproduction and display operation of a moving picture file distributed or attached to an e-mail, or a still image. A display area 135 has the size of 96×80 pixels, and is an area when the moving picture file is reproduced and displayed. A reproduction time gage 136 is directed for indicating at what time during the entire reproduction time of the moving picture file the image being currently displayed during reproducing and displaying the moving picture file is. An e-mail text display area 137 is an area where the e-mail text is displayed, where a scroll bar for scrolling and displaying the text is displayed at the right end when the text is so long that the text cannot fall within the area.

A display area "SAVE/EXIT" 138 is a guidance display area for instructing "save/exit". A display area "CREATION/EDITION" 139 is a guidance display area for instructing "creation/edition". A display area "IMAGE SELECTION" 140 is a guidance display area for instructing "image selection". The display areas 138, 139, and 140 correspond to the operations of the e-mail key 141, the shutter key 145, and the function key 143 in the appearance view of FIG. 2, respectively. The function key 143 is also used for controlling reproduction and display/suspension of a moving picture file.

Figure 14:
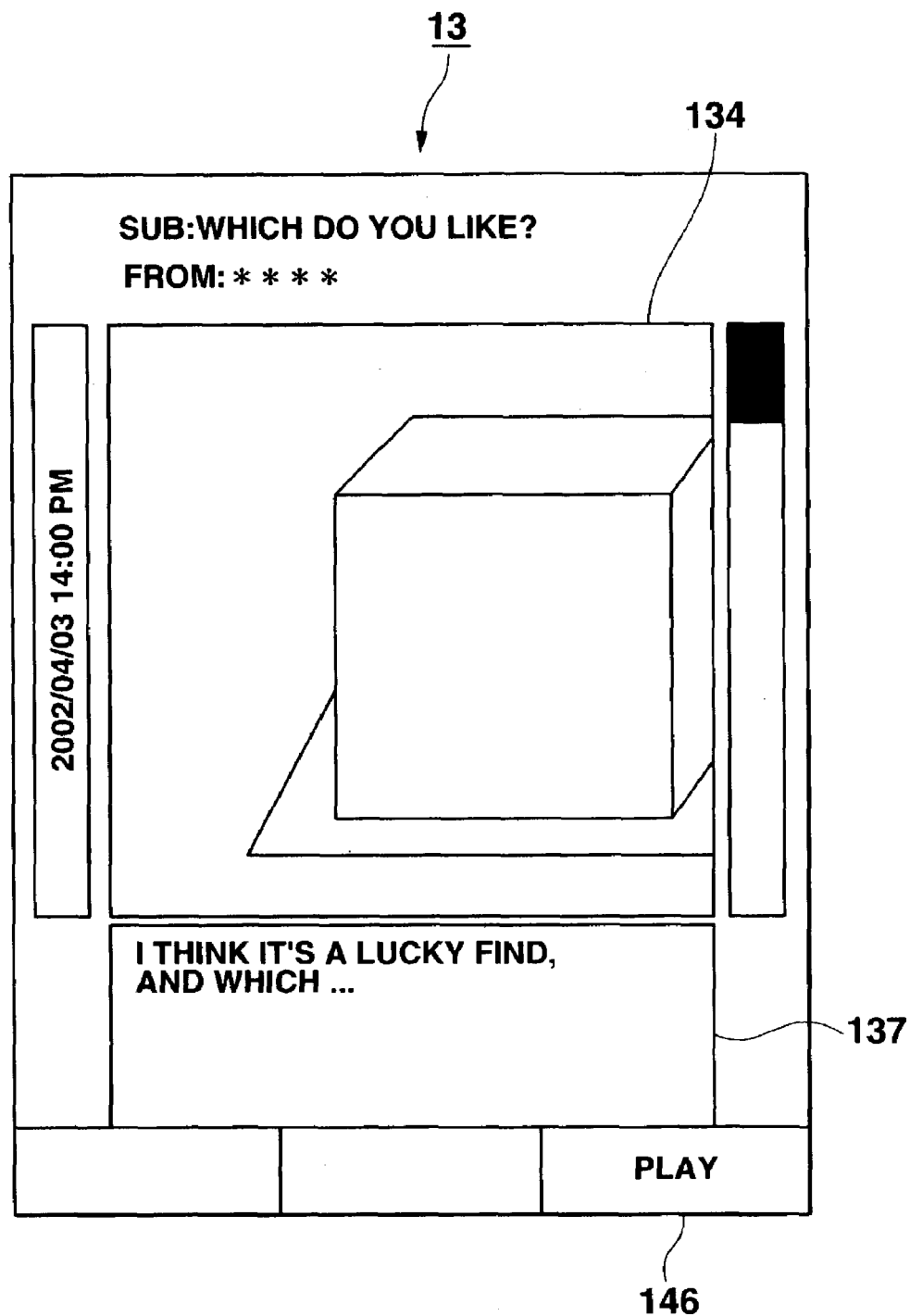
FIG. 14 is a schematic diagram showing one example of the display screen when "e-mail creation/edition" is selected.

FIG. 14 is a schematic diagram showing one example of the above display screen. The e-mail title of "which do you like?" is displayed in the Subject area 131. The name **** of the e-mail transmitter is displayed in the "From" area 132. The creation date/time "2000/04/03 14:00 PM" of the attached moving picture file is displayed in the date/time display area 133. The selected moving picture (still image) is displayed in the display area 134 on 128×96 pixels (Sub-QCIF size). The e-mail text being created is displayed in the e-mail text display area 137. A display area "PLAY" 146 (corresponding to the function key 143) for instructing reproduction of a moving picture is displayed in the lowest line in the display screen.

Returning to the description of the operation, in the display screen shown in FIG. 14, it is determined whether or not the function key 143 is operated by the user in correspondence to the display area "PLAY" 146 (step S82). When the function key 143 is not operated, the shutter key 145 is operated to determine whether or not decision is detected (step S84). When neither the operation of the function key 143 for instructing reproduction nor the operation of the shutter key 145 for instructing decision is detected, the processing returns to step S80, where the screen display shown in FIG. 14 is continued.

When the function key 143 is operated in correspondence to the display area "PLAY" 146, it is determined whether or not the moving picture file is already read and selected from the image memory 23 (step S86). When the moving picture file is read and selected, the moving picture file is resized to 96×80 pixels to be reproduced and displayed (step S88), and the moving picture file is repeatedly reproduced (step S90). In other words, the image shown in FIG. 14 is resized to 96×80 pixels to start reproduction and display.

FIGS. 15A to 15C are schematic diagrams showing one example of the display screen when the moving picture file of the object picked up in the image pickup direction shown in FIG. 8 in the camera mode is reproduced and displayed in the e-mail creation mode. The moving picture file is reproduced and displayed on 96×80 pixels in the display area 135 in the order shown in FIGS. 15 A to 15C. Further, the display area "PAUSE" 147 instead of the display area "PLAY" 146 of the display screen being reproduced, and corresponds to the operation of the function key 143.

During reproducing and displaying the moving picture file, it is determined whether or not the function key 143 is pressed in correspondence to the display area "PAUSE" 147.

(step S92), and the reproduction and display in step S90 is repeatedly continued until the function key 143 is pressed.

Figure 16A:
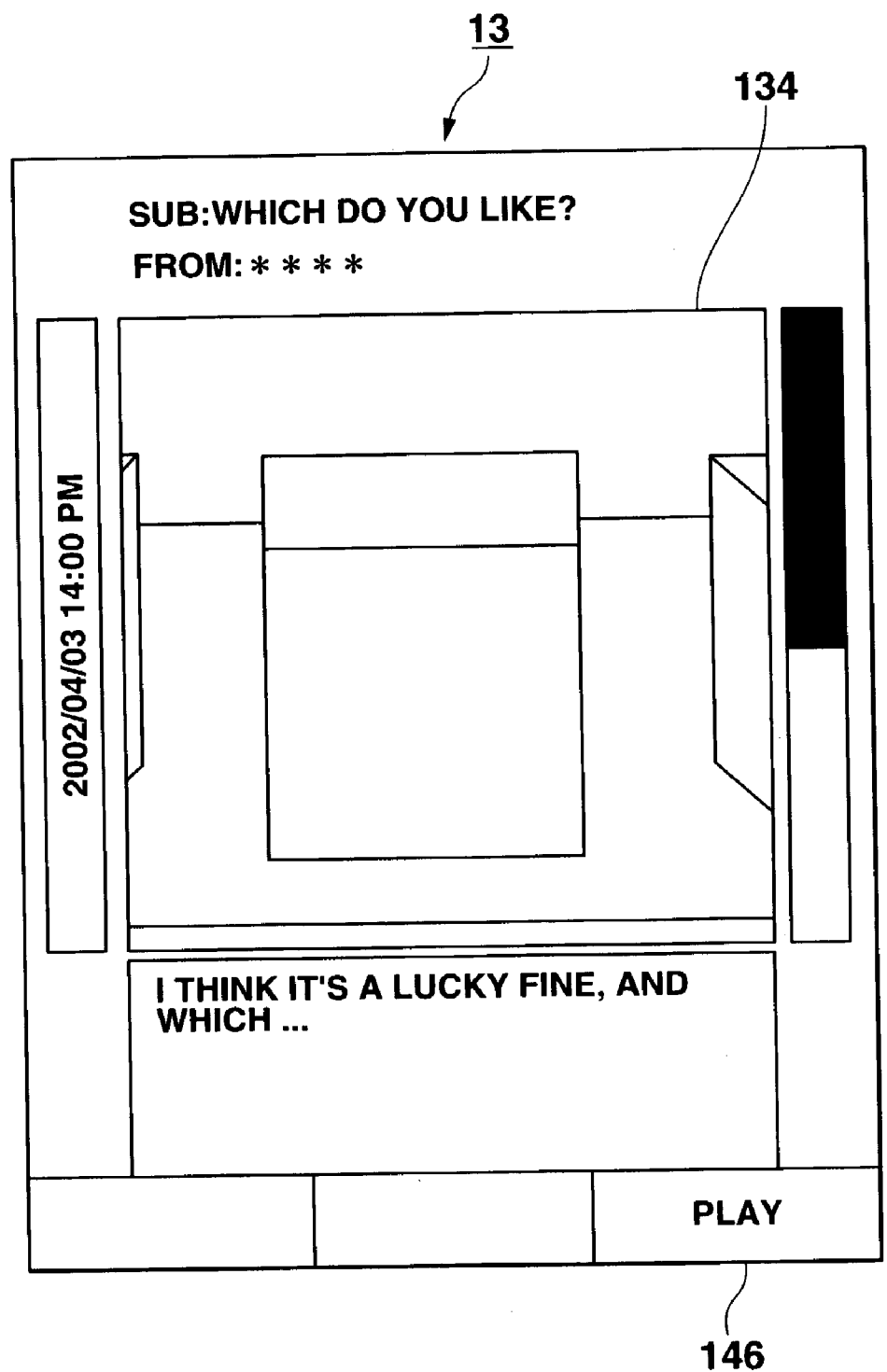
FIG. 16A is a schematic diagram showing the display screen when a moving picture being reproduced is suspended.

During reproducing the moving picture file, when the function key 143 is pressed in correspondence to the display area "PAUSE" 147, the reproduction is suspended (step S94). During suspending the reproduction, as shown in FIG. 16A, the image at that time is resized to Sub-QCIF size (128×96 pixels) and the display is maintained. Thereafter, the processing returns to step S80, where the above processing is repeated.

In this manner, according to the first embodiment, even when the e-mail text is being created/edited, it is possible to easily reproduce/suspend the moving picture and to confirm the same, and further it is possible to confirm the contents of the moving picture file to be attached to the e-mail text on the same screen.

Further, in step S80, when the "creation/edition" screen is being displayed, in the case where the function key 143 is operated in the state where the moving picture is not selected, a message of "moving picture is not selected" is displayed (step S96). It is determined whether or not a predetermined time is lapsed (step S98). When the predetermined time is not lapsed, the processing returns to step S96, where the message display is continued.

When the message is displayed over the predetermined time, the message is erased (step S100). Thereafter, the processing returns to step S80, where the above processing is repeated.

Figure 9:
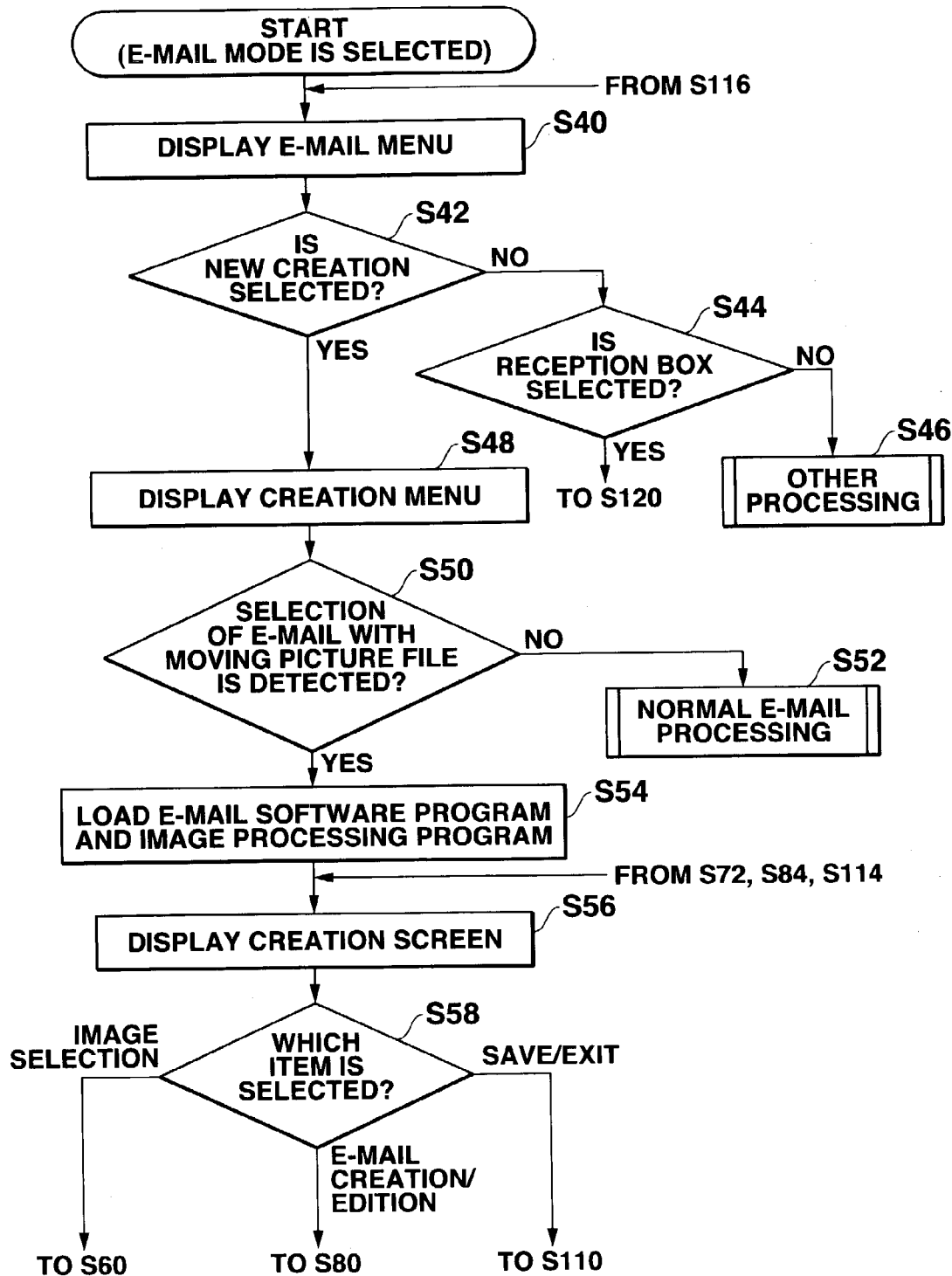
FIG. 9 is a flow chart for explaining an operation of an e-mail mode according to the first embodiment.
Figure 10:
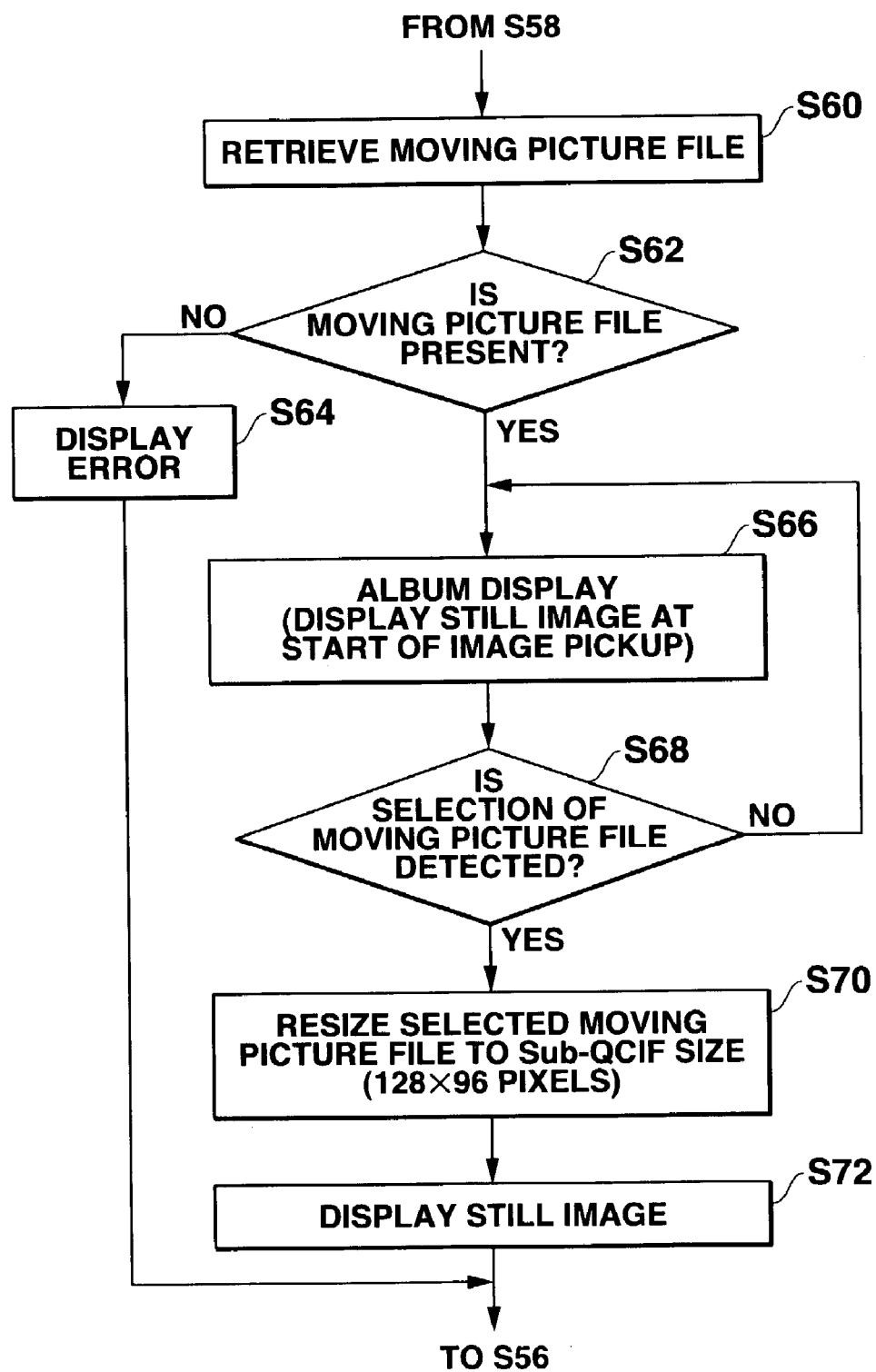
FIG. 10 is a flow chart for explaining the operation of the e-mail mode according to the first embodiment.
Figure 11:
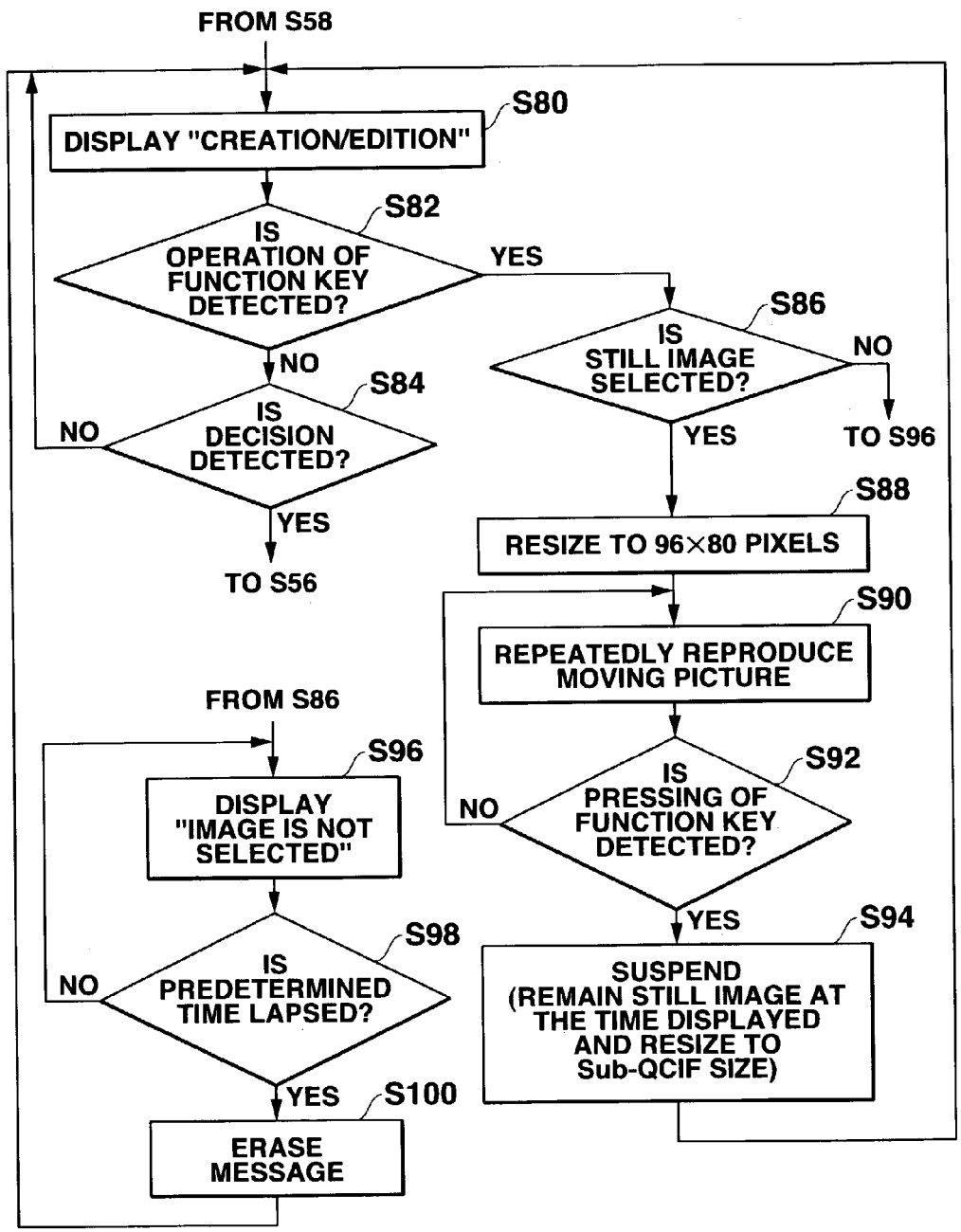
FIG. 11 is a flow chart for explaining the operation of the e-mail mode according to the first embodiment.
Figure 12:
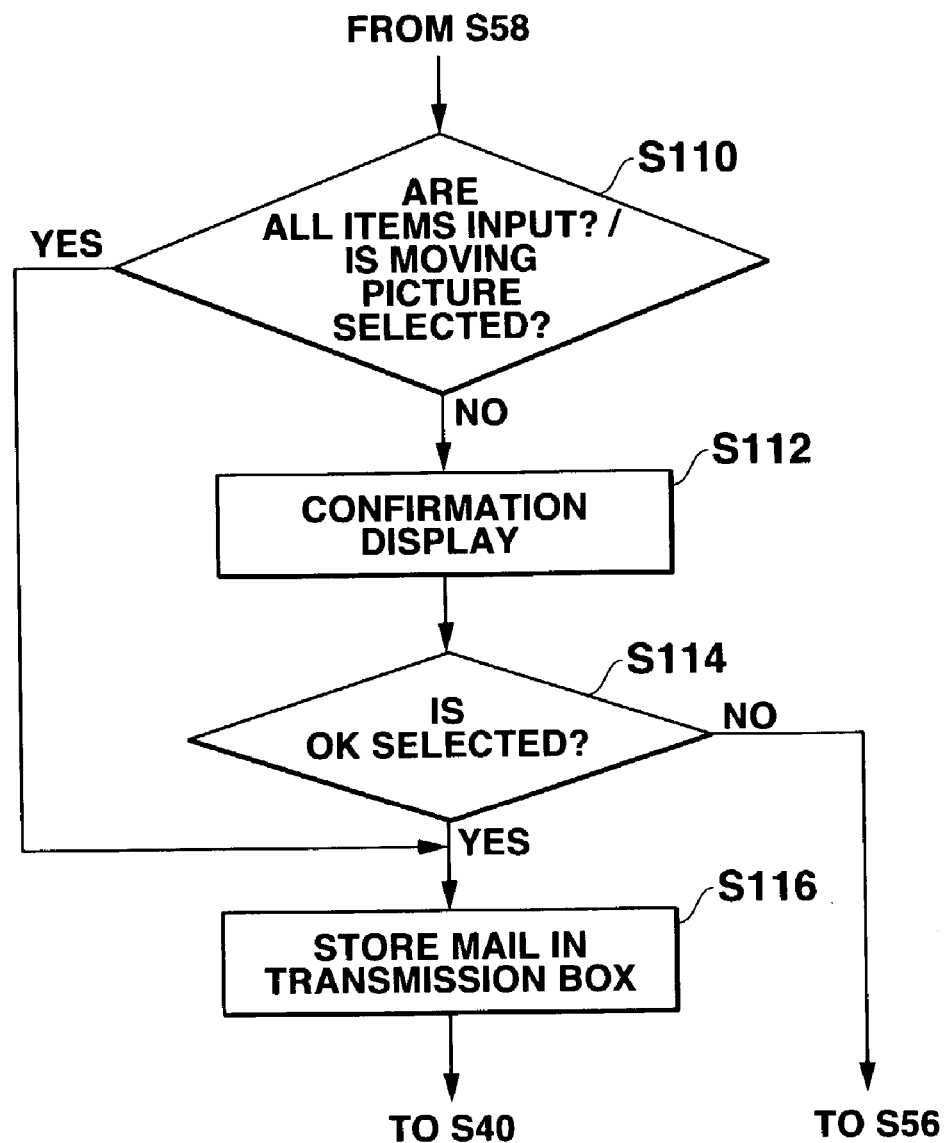
FIG. 12 is a flow chart for explaining the operation of the e-mail mode according to the first embodiment.

In step S80, in the case where the operation of "decision" is detected when the "creation/edition" screen is displayed, the processing returns to the creation screen in step S56 shown in FIG. 9, where the above processing is repeated.

When the display area "SAVE/EXIT" 138 is selected in the creation screen, it is determined whether all items are input or the moving picture file is selected (step S110). When a blank item is present or the moving picture file is not selected, a confirmation display is performed for the user (step S112), and it is determined whether or not "OK" is selected (step S114). When "OK" is not selected, that is when a blank item is present or the moving picture file is not selected, the processing returns to step S56 shown in FIG. 9, and proceeds to the creation screen. Thereafter, the user completes the e-mail by inputting the blank item or selecting the moving picture file.

On the other hand, the case where "OK" is selected in the confirmation display for the user means that a blank item may be present or the moving picture file is not required to select, so that the e-mail is stored in the transmission box (step S116). FIG. 16B is a diagram showing stored contents of the transmission e-mail data storage area 2921 where the contents of the created e-mail are stored. In the drawing, in correspondence to the above operations (FIGS. 14 to 16A), in a field 929 to which a record No. 003 is newly assigned, "2002/04/03 14:00" is stored in an e-mail creation date/time area 922, "aaa@mail.com/which do you like?/ . . . (other header information is omitted)" is stored in an e-mail header information (including an e-mail address at a transmission destination and a subject) area 923, "I think it's a lucky find! Which do you like? Please RES!" is stored in an e-mail text (message) area 924, "1" is stored in a flag "A" area 925, and "0002" is stored in a storage address area 926. When this created e-mail is transmitted, "1" is stored in a flag "B" area 927 and the transmission date/time is stored in a transmission date/time area 928.

When the e-mail with a moving picture is created in this manner, as the subsequent processing, the processing returns to the e-mail menu display in step S40, where the above processing is repeated. Then, the e-mail is stored in the transmission box (step S116), and the processing returns to the e-mail menu display in step S40, where the above processing is repeated. The e-mail with a moving picture file stored in the transmission box is transmitted at a predetermined timing.

(3) Received E-Mail Confirmation

Next, there will be described the case where the e-mail with a moving picture file created in the cellular phone 1a in the above manner is received at the cellular phone 1b. The incoming processing of the e-mail with a moving picture file is not different from the conventional incoming processing of the e-mail so that the description thereof will be omitted.

Figure 17:
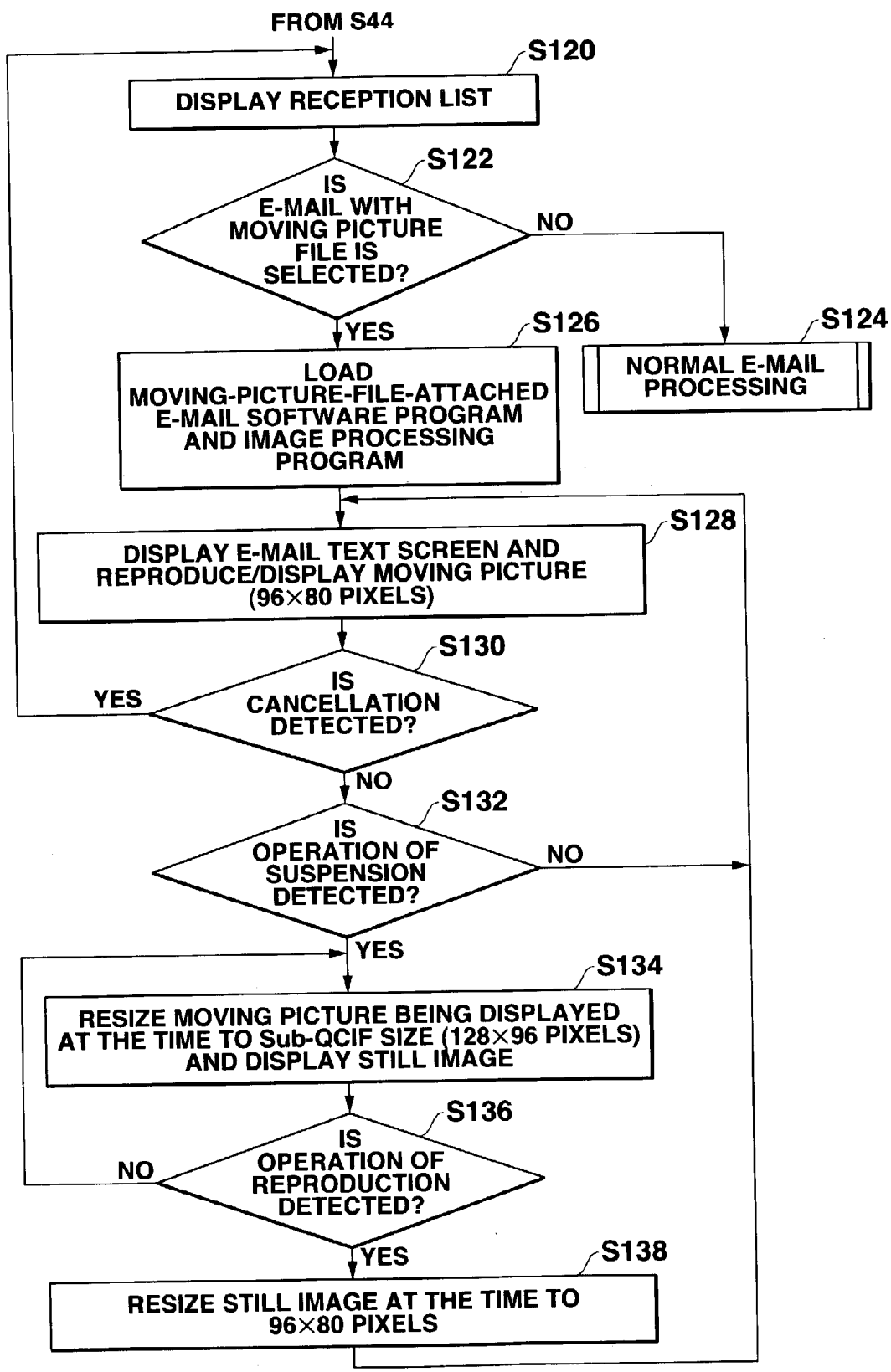
FIG. 17 is a flow chart for explaining an operation of received e-mail confirmation in a cellular phone according to the first embodiment.
Figure 19D:
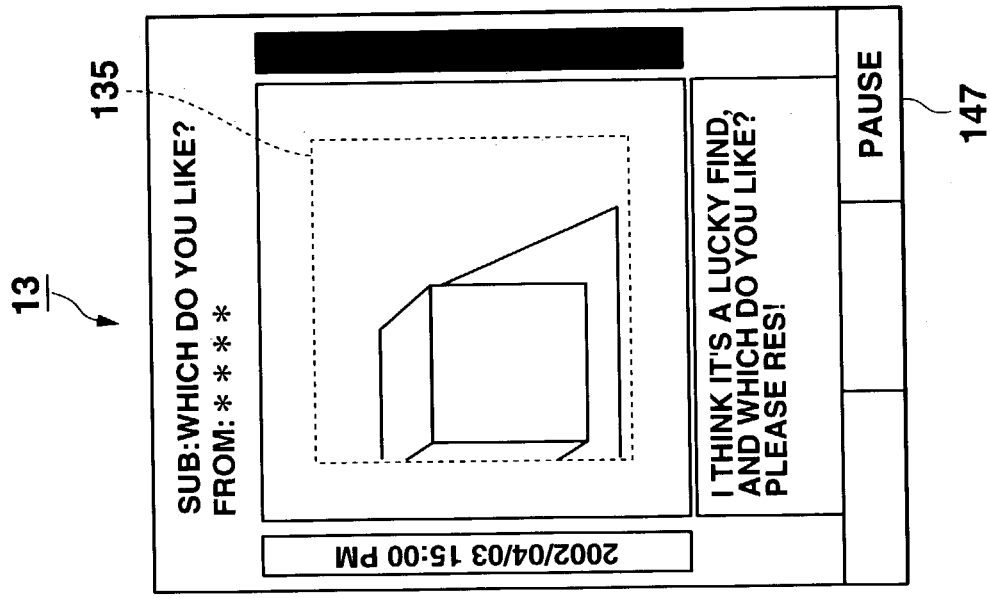
Figure 19E:
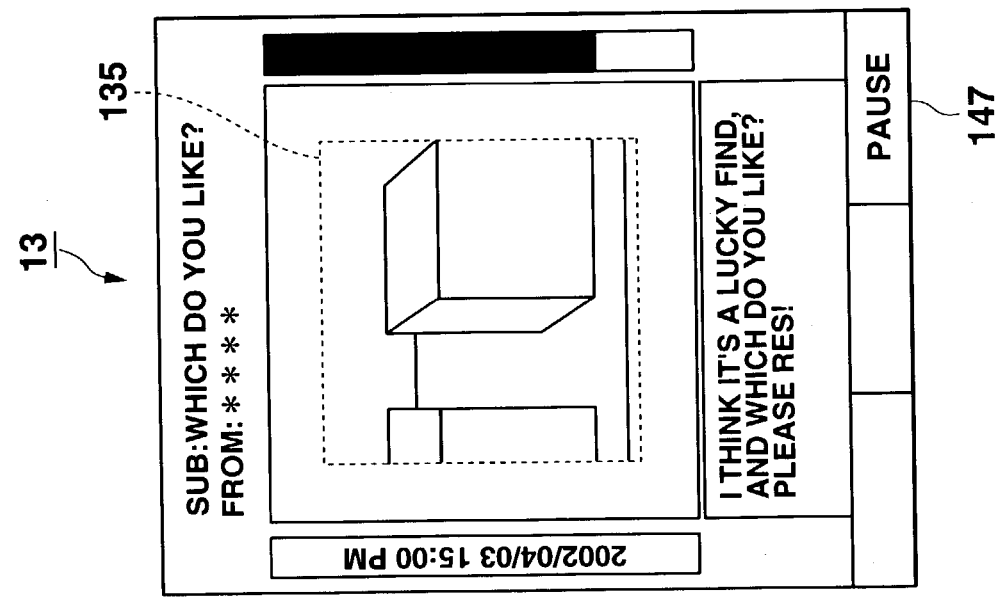

FIG. 17 is a flow chart for explaining an operation of received e-mail confirmation. The received e-mail confirmation processing is performed when the reception box is selected in step S44 in the above flow chart at the time of e-mail creation.

When the reception box is selected, a list of received e-mails stored in the reception box is displayed (step S120). It is determined whether or not an e-mail with a moving picture file is selected (step S122). When a normal e-mail is selected, the processing proceeds to the normal e-mail processing (step S124).

When the e-mail with a moving picture file is selected, the program stored in the e-mail software program area 2412 and the program stored in the image processing program area 2413 are loaded (step S126) to be received with the e-mail text display and this e-mail text. The moving picture file stored in the attached file storage area 293 is read so that moving picture reproduction (90×80 pixels) is performed (step S128). FIG. 18 is a diagram showing stored contents of the reception e-mail data storage area 2921 where the contents of the e-mail received at the cellular phone 1b are stored. In the drawing, in a field 938 to which a record No. 002 is newly assigned, "2002/04/03 15:00" is stored in an e-mail reception date/time area 922, "ccc@mail.com/which do you like?/ . . . (other header information is omitted)" is stored in an e-mail header information (including an e-mail address of a transmission source and a subject) area 933, "I think it's a lucky find! Which do you like? Please RES!" is stored in an e-mail text (message) area 934, "1" is stored in a flag "A" area 935, "0001" is stored in a storage address area 936, "1" is stored in a flag "C" area 937.

FIGS. 19A to 19E are schematic diagrams showing one example of the display screen during reproducing a moving picture in the received e-mail with the moving picture file. In the display area 135, the moving picture file is reproduced and displayed in the order of FIGS. 19A to 19E. Further, the display area "PAUSE" 147 (corresponding to the function key 143) for guiding suspension of the moving picture is displayed at the lowest line of the display screen being reproduced.

During displaying the received e-mail, it is determined whether or not cancellation is detected (step S130). When cancellation is detected, the processing returns to the reception list display in step S120, where the above processing is repeated. When cancellation is not detected, it is determined whether or not the function key 143 is operated in order to suspend the moving picture reproduction (step S132). When the function key 143 is not operated for suspension, the processing returns to step S128, where the e-mail text display and the moving picture reproduction are continued.

Figure 20:
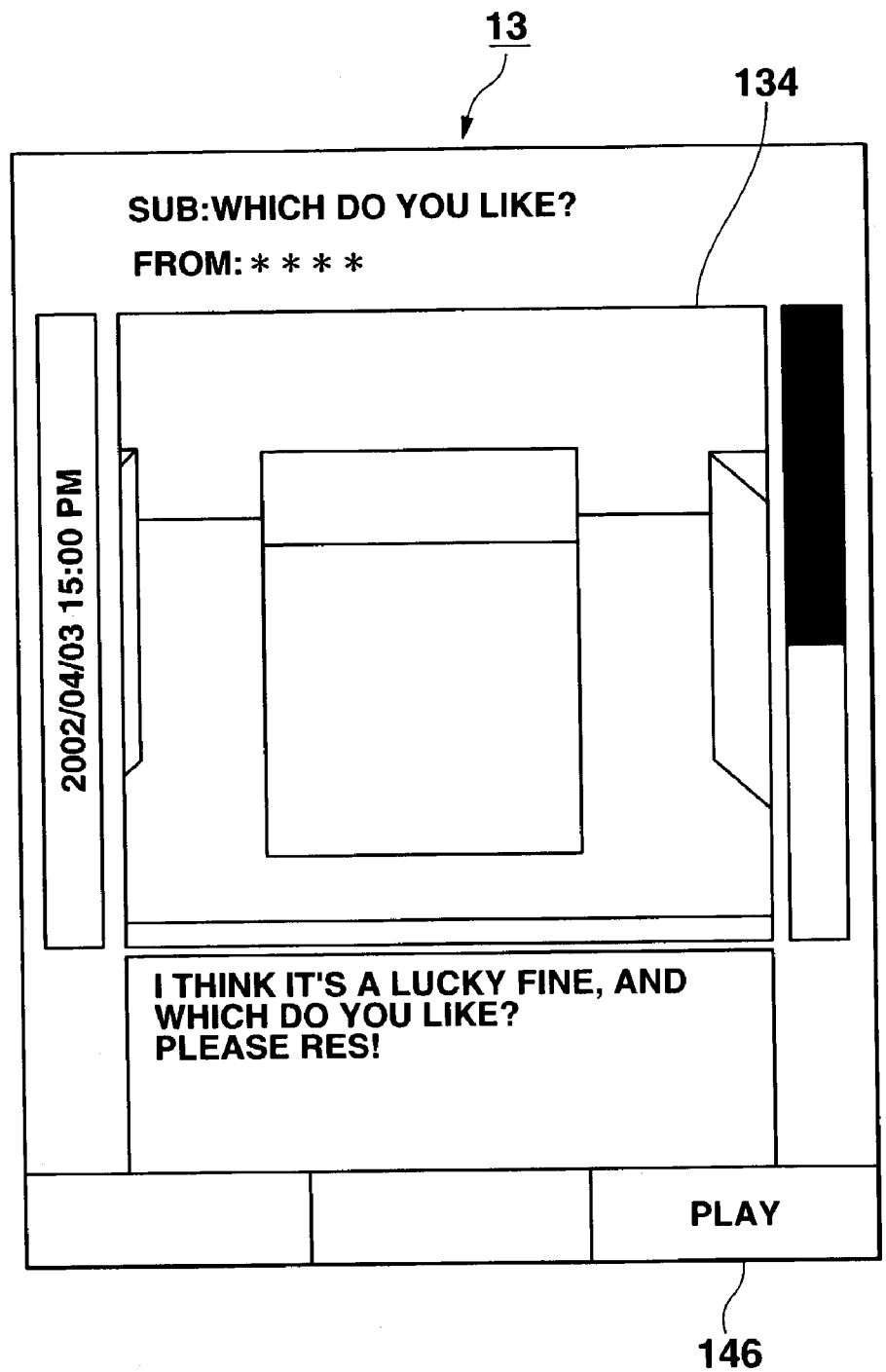
FIG. 20 is a schematic diagram showing one example of the display screen when a moving picture in a received e-mail with a moving picture file is being suspended to reproduce.

When the function key 143 is operated for suspension, with respect to the moving picture being reproduced at that time, as shown in FIG. 20, the image when the suspension is detected is resized to 128×96 pixels (Sub-QCIF size) so that the still image is displayed (step S134). It is determined whether or not the function key 143 is operated in order to instruct the display area "PLAY" 146 for reproduction (step S136). When the reproduction is not instructed, the processing returns to step S134, where the suspension state is continued. When the function key 134 is operated for reproduction, the still image display at that time is resized to 96×80 pixels (step S138), and the processing returns to the e-mail text display and the moving picture reproduction in step S128, where the above processing is repeated.

In the first embodiment, the details of the cellular phone having a camera (image pickup function) is described, but the present invention is not limited thereto, and can be applied to a portable electronic device (mobile PC, PDA) having an e-mail (message) creation function and a moving picture pickup function.

Other embodiments of the communication apparatus according to the present invention will be described. The same portions as those of the first embodiment will be indicated in the same reference numerals and their detailed description will be omitted.

Second Embodiment

There is described the case where the present invention is applied to a cellular phone having an image pickup function according to the first embodiment. There will be described the case where the present invention is applied to a cellular phone capable of receiving a video distributed by a digital broadcast system according to a second embodiment.

Description of similar portions to those in the above first embodiment in the system configuration, the appearance of the cellular phone, and the main configuration of the cellular phone will be omitted.

B-1. Configuration of the Embodiment

Figure 21:
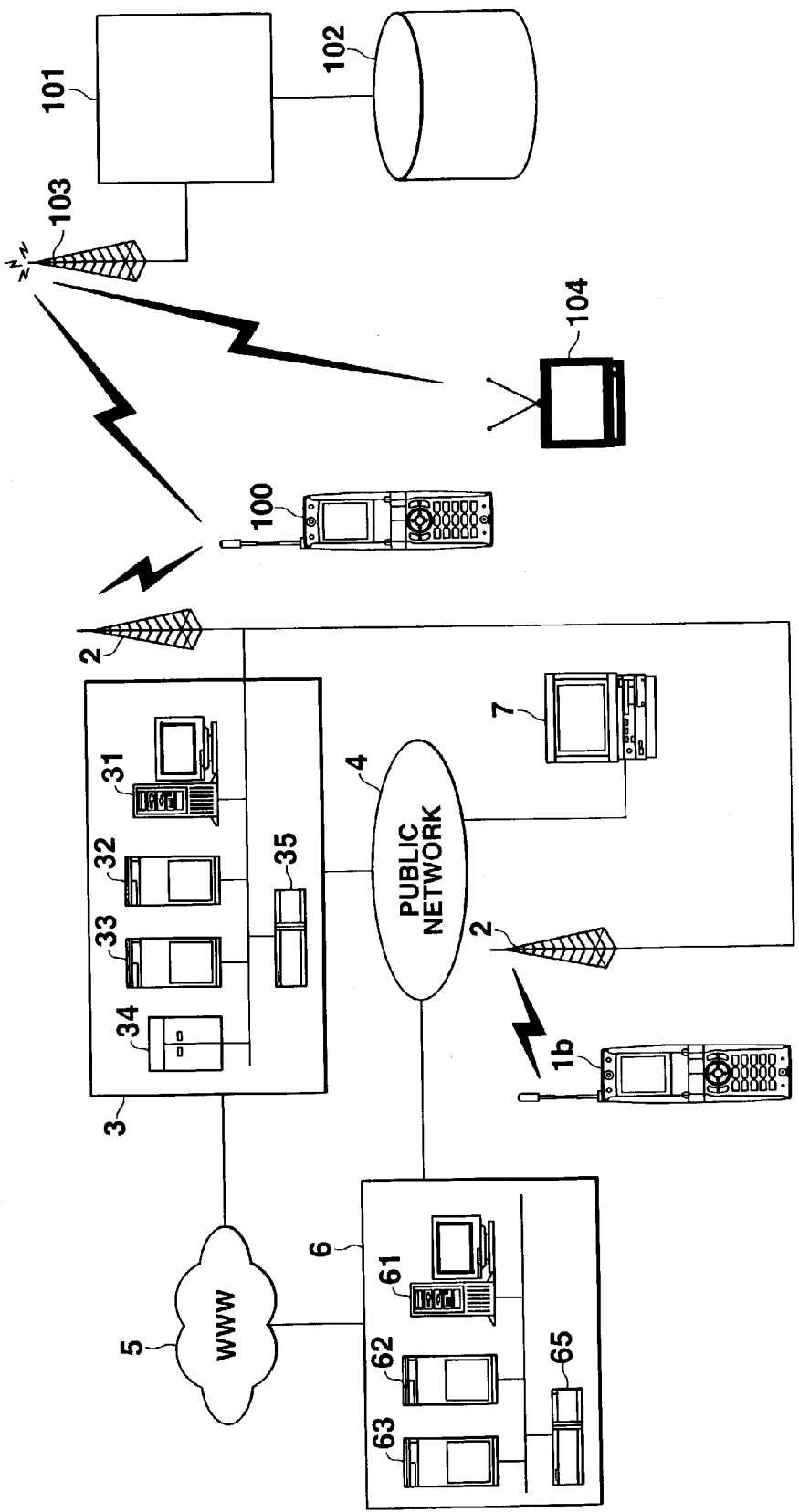
FIG. 21 is a block diagram showing a configuration of an e-mail transmission/reception system according to a second embodiment of the present invention.
Figure 22:
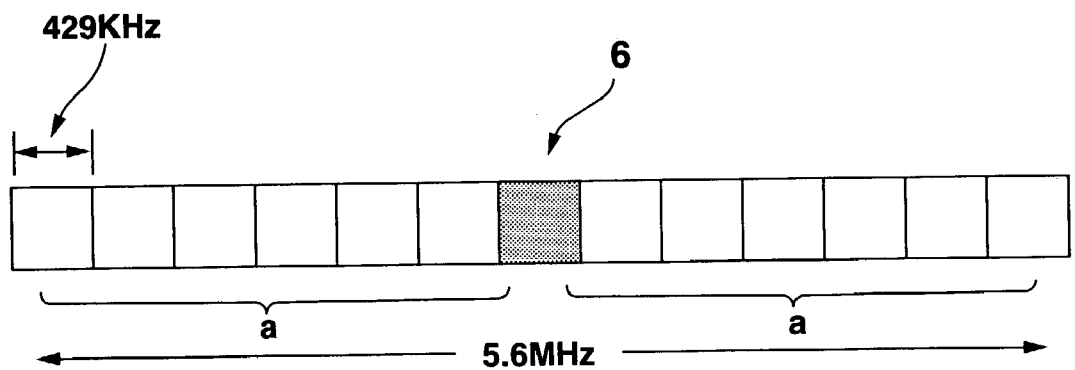
FIG. 22 is a diagram showing a configuration of segments of a carrier wave assigned to one broadcast station.

FIG. 21 is a block diagram showing a configuration of an e-mail transmission/reception system according to the second embodiment of the present invention. The second embodiment differs from the first embodiment in that a cellular phone 100 has a broadcasting reception function from the digital broadcast system (broadcast station 101, video database 102, broadcast antenna 103, digital broadcast receiver 104). The cellular phone (wireless communication terminal/data communication apparatus) 100 has a digital broadcasting reception function, and details thereof are as follows: one segment corresponding to the center portion "b" in the carrier wave which is divided into 13 segments with a band of 5.57 MHz per broadcast station (429 KHz per segment) modulated by the OFDM (Orthogonal Frequency Division Multiplexing) method as shown in FIG. 22 is received. A video encoded by MPEG-4 method is set by the QPSK (Quadrature Phase Shift Keying) modulation method in this segment.

In FIG. 22, a video encoded by MPEG-2 method is set in the 64QAM (Quadrature Amplitude Modulation) modulation method such that segments "a" can be received by the digital broadcast receiver 104.

The broadcast station 101 modulates a digital video accumulated in the video database 102 or a digital video acquired by a network (not shown) by the above OFDM method, and distributes the same by the broadcast antenna 103.

Figure 23:
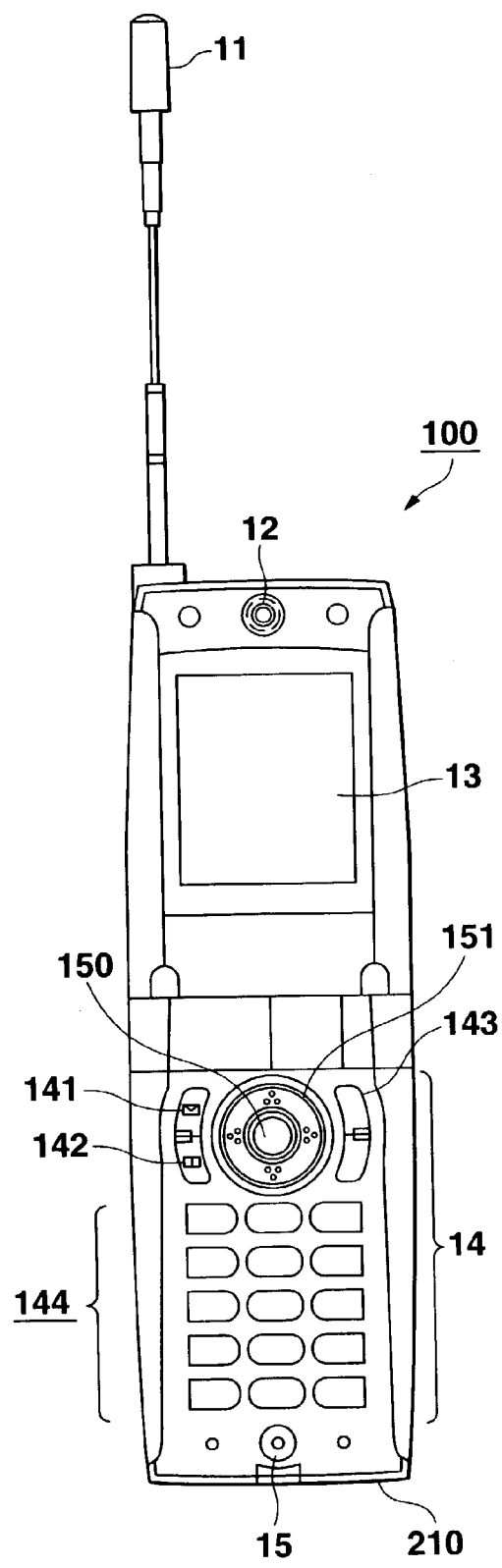
FIG. 23 is an appearance view (opened state: front view) of a cellular phone 100.

FIG. 23 is an appearance view (opened state: front view) of the cellular phone 100. The cellular phone 100 according to the second embodiment is substantially the same as the cellular phone 1a, 1b according to the first embodiment, but has the digital broadcasting reception function instead of the image pickup function (image pickup lens 18, camera module 181, DES 182). The cellular phone 100 incorporates the digital broadcasting reception antenna 210 therein, and has a capture key 150 operated when a desired video is recorded while the user is receiving digital broadcast instead of the shutter key 145. The channel is changed by operating the left or right side of a cross key 151.

Figure 24:
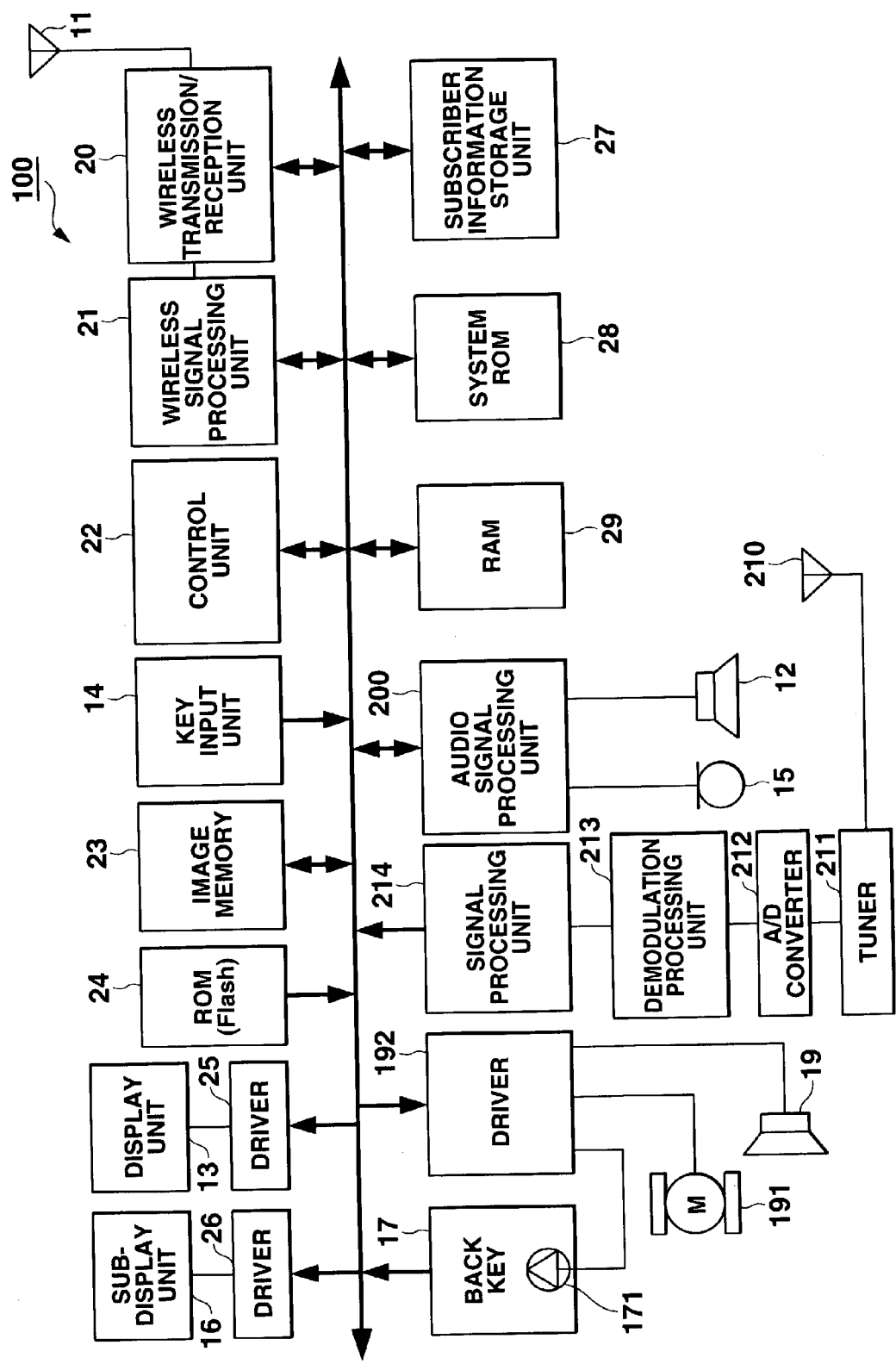
FIG. 24 is a block diagram showing a configuration of the cellular phone 100.

FIG. 24 is a block diagram showing a configuration of the cellular phone 100. As described above, since the digital broadcasting reception function is provided instead of the image pickup function, there is provided each circuit for digital broadcasting reception comprising an antenna 210, a tuner 211, an A/D converter 212, a demodulation processing unit 213, and a signal processing unit 214 instead of the image pickup lens 18, the camera module 181, and the DSP 182. Where the user operates the cellular phone 100 to receive the digital broadcast, when transition is performed to a TV reception mode through a predetermined key operation, power is supplied to each circuit for digital broadcasting reception so that the tuner 211 receives the RF signal to frequency-convert it into the IF signal. The A/D converter 212 samples or quantizes this IF signal to output it to the demodulation processing unit 213. The demodulation processing unit 213 quadrature-modulates the digital IF signal output by the A/D converter 212 and detects the operation of the cross key 151 by the user from the resultant base band OFDM signal to extract data included in a sub-carrier corresponding to the selected reception channel and to output it to the signal processing unit 214. The signal processing unit 214 extracts data of the segment "b" modulated in the QPSK method from the data output from the demodulation processing unit 213 or the data comprising 13 segments shown in FIG. 22 in detail, and decodes the data in a decoding method corresponding to this modulation method to sequentially send the video data encoded in MPEG-4 method to the driver 25.

The image memory 23 is a memory for storing a moving picture file based on the captured video (moving picture) or an image file downloaded via WWW 5 in the TV reception mode therein. The ROM 24 comprises a programmable ROM (flash memory) and stores various programs specific to the present embodiment described later therein.

Figure 25:
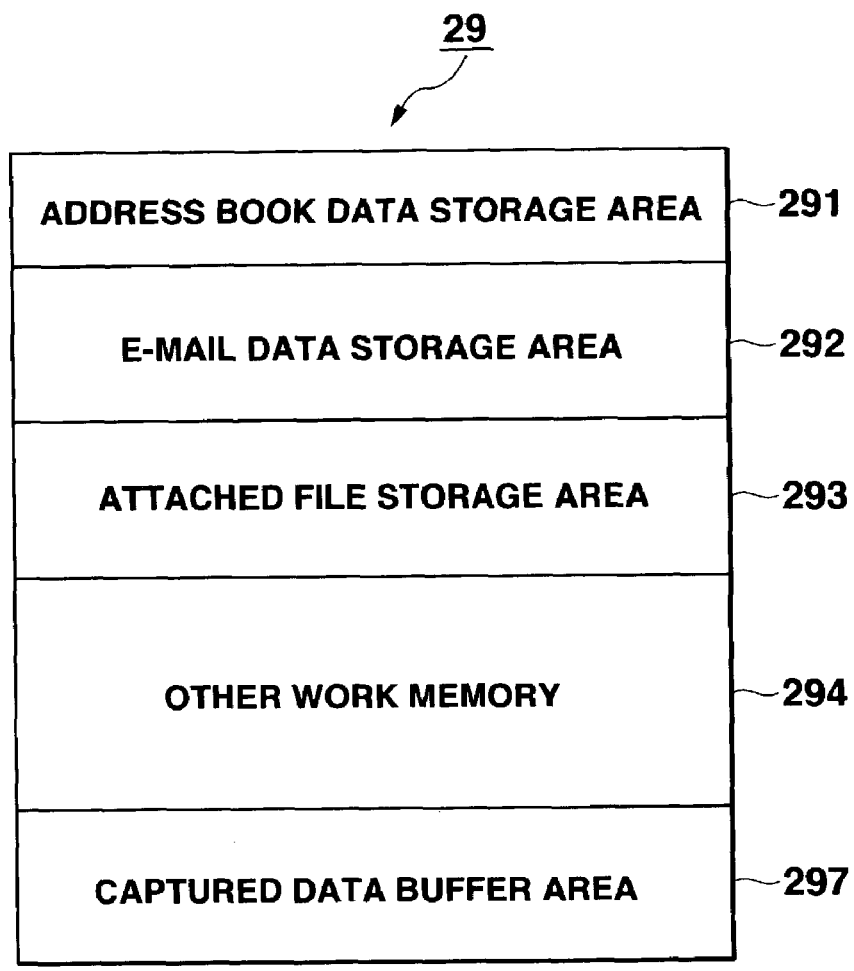
FIG. 25 is a conceptual diagram showing a configuration of a memory area of the RAM 29 of the cellular phone 100.

The RAM 29 comprises a capture data buffer area 297 for buffering a video captured in the TV reception mode one time as shown in FIG. 25.

According to the second embodiment, a moving picture file based on the video data captured in the TV reception mode is included in the image data stored in the image data management table 296 shown in FIG. 5E. When the video data is stored, the broadcast information data (channel number, broadcast station name, program name) transmitted with the video data is stored in the item of the property data.

B-2. Operation of the Embodiment

An operation of the aforementioned second embodiment will be described.

Figure 26:
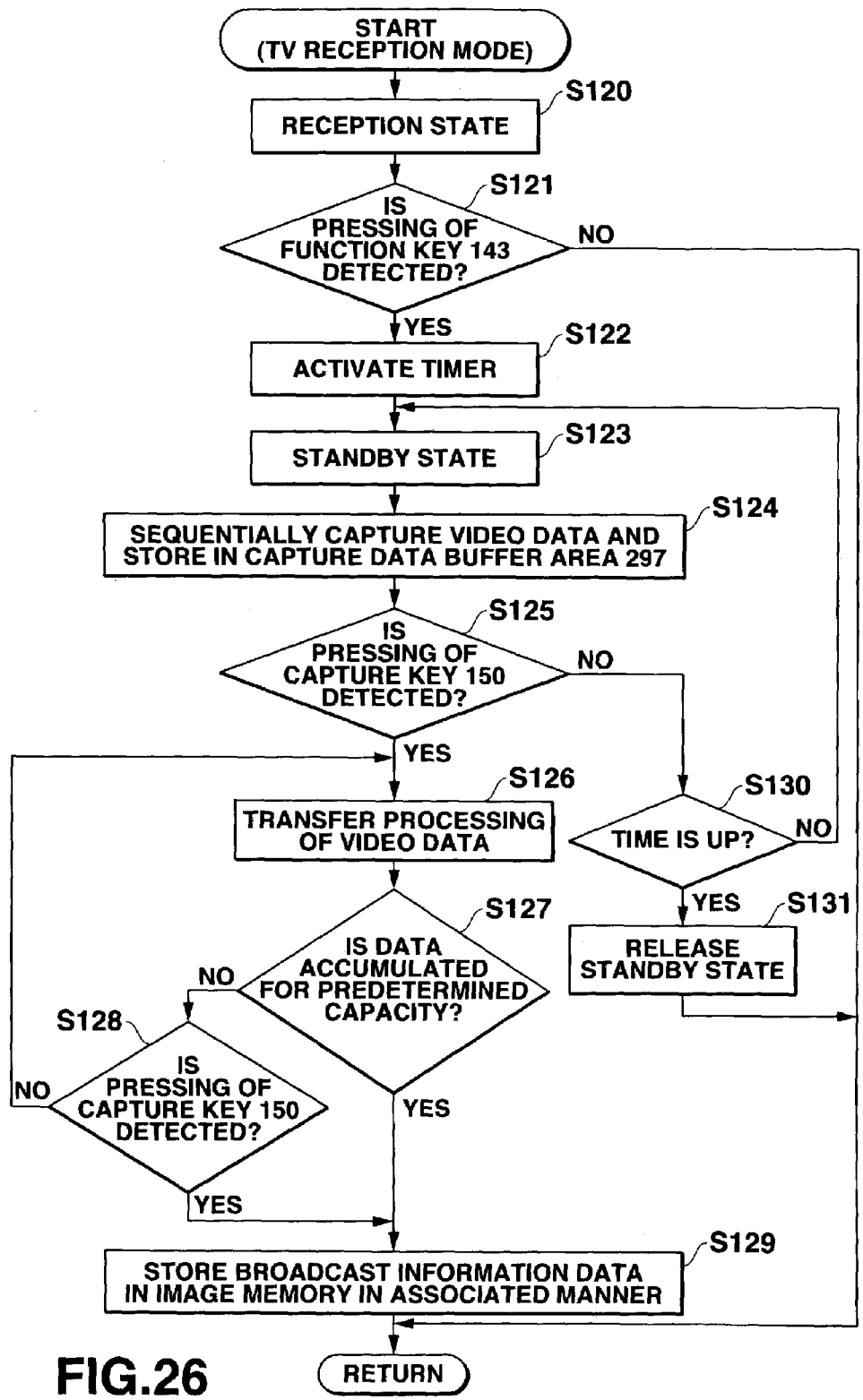
FIG. 26 is a flow chart for explaining an operation in a TV reception mode according to the second embodiment.
Figure 27:
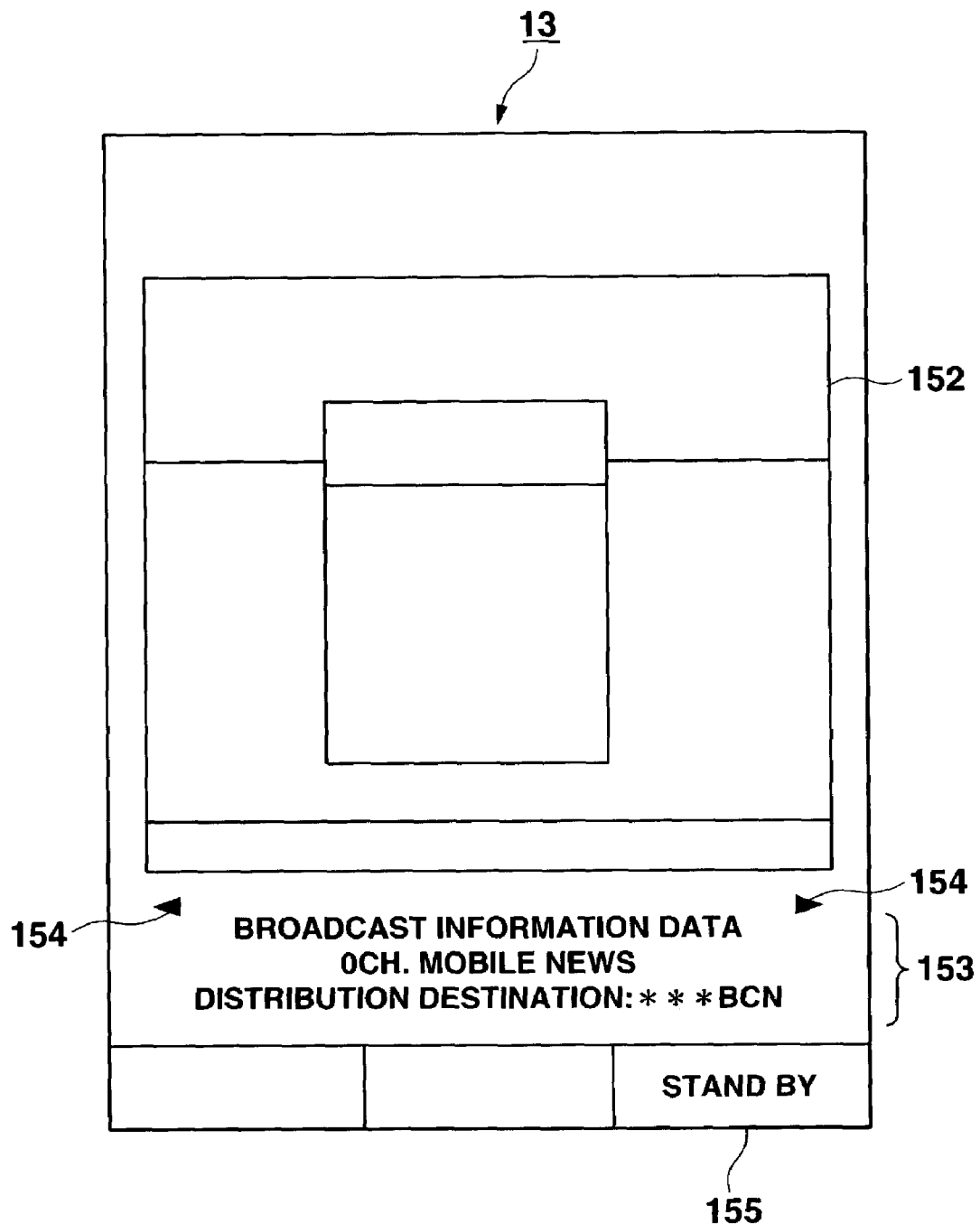
FIG. 27 is a schematic diagram showing the display screen in the TV reception mode.

FIG. 26 is a flow chart for explaining an operation in the TV reception mode according to the second embodiment. When the TV reception mode is selected by the user, power is supplied to each circuit for digital broadcasting reception, and the video data distributed from the broadcast station 101 is received through the above processing and displayed on the display unit 13 (reception state: step S120). FIG. 27 is a schematic diagram showing the display screen of the display unit 13 in the TV reception state in step S120. In the drawing, a video distributed from the broadcast station 101 and the broadcast antenna 103 is displayed in the video display area 152. The channel number, the program name, and the broadcast station name distributed with the video data are displayed in the broadcast information data display area 153, which are the channel number of "0 ch", the program name of "Mobile news", and the broadcast station name (distribution source) of "*BCN", respectively. An arrow icon 154 is a mark for station selecting instruction. A mark indicated recording standby instruction is displayed on the display area "STAND BY" 155**.

Figure 28:
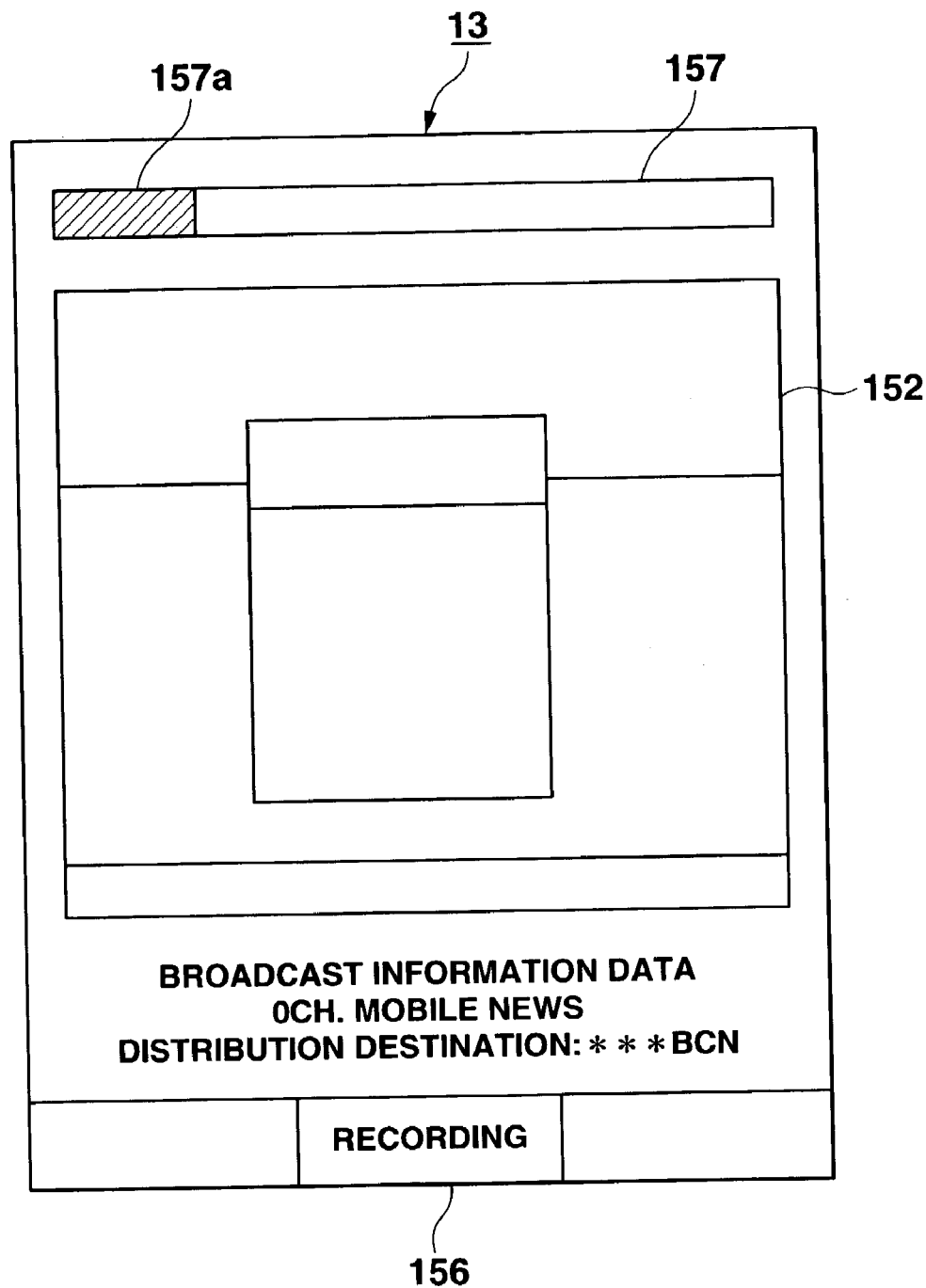
FIG. 28 is a schematic diagram showing the display screen in a standby state.

In this display state, it is determined whether or not the operation of the function key 143 by the user is detected (step S121). When the operation is detected, a timer incorporated in the control unit 22 is activated and timekeeping for the predetermined time is started (step S122), the state is transited to the recording standby state (step S123), and a processing of sequentially copying and writing the video data supplied to the driver 25 in the capture data buffer area 297 is started with the video when the timekeeping is started as the first frame (step S124). FIG. 28 is a schematic diagram showing the display screen of the display unit 13 in the standby state in step S124. In the drawing, the contents of the video display area 152 and the broadcast information data display area 153 are the same as those in the above reception state, but a gage 157 indicating a buffering state is displayed instead of the arrow icon 154. This gage is displayed when the operation of the function key 143 is detected, and how much the video data being currently distributed is recorded in the capture data buffer area 297 is expressed by the length of the bar 157*a*. When this bar 157*a* reaches the right end in the gage 157, time is up. A display area "RECORDING" 156 shows a mark for recording instruction.

When the operation of the capture key 150 corresponding to the recording instruction mark 156 by the user is detected in the standby state in step S123 (step S125), transfer of the video data to the image memory 23 is started with the video data when the capture key 150 is operated as the first frame (step S126). When this video data is transferred, part of the broadcast information data, that is the broadcast station name in the second embodiment is recorded to be displayed at the end of the displayed video and transferred.

In the process of the transfer of this video data to the image memory 23, it is determined whether or not a predetermined capacity (for example, 100K bytes) of video data is accumulated (step S127). In the process where the video data is accumulated up to the predetermined capacity, it is determined whether or not the pressing of the capture key 150 is released (step S128). When the predetermined capacity is not reached and the pressing of the capture key 150 is not released, the processing returns to step S126, where the video data is continued to accumulate in the capture data buffer area 297.

When the predetermined capacity is reached or the pressing of the capture key 150 is released, the video data at the time of release is stored in the image memory 23 as the final frame and is converted to a moving picture file, the broadcast information data being currently distributed is acquired and stored in correspondence to the moving picture file, and the capture data buffer area 297 is cleared (step S129). Thereafter, the state is returned to the reception state in the TV reception mode (step S120).

In step S130, when time is up in the timer in the standby state, the standby state is released and the state is returned to the TV reception state (step S131).

In this manner, when the transition to the standby mode for capturing the video data and the pressing of the capture key 150 over the predetermined time are detected in the TV reception mode, the video data transferred from the start of the pressing is sequentially accumulated in the image memory 23. When the predetermined capacity (100K bytes) is exceeded or the pressing of the capture key 150 is released, this processing is stopped.

Figure 29:
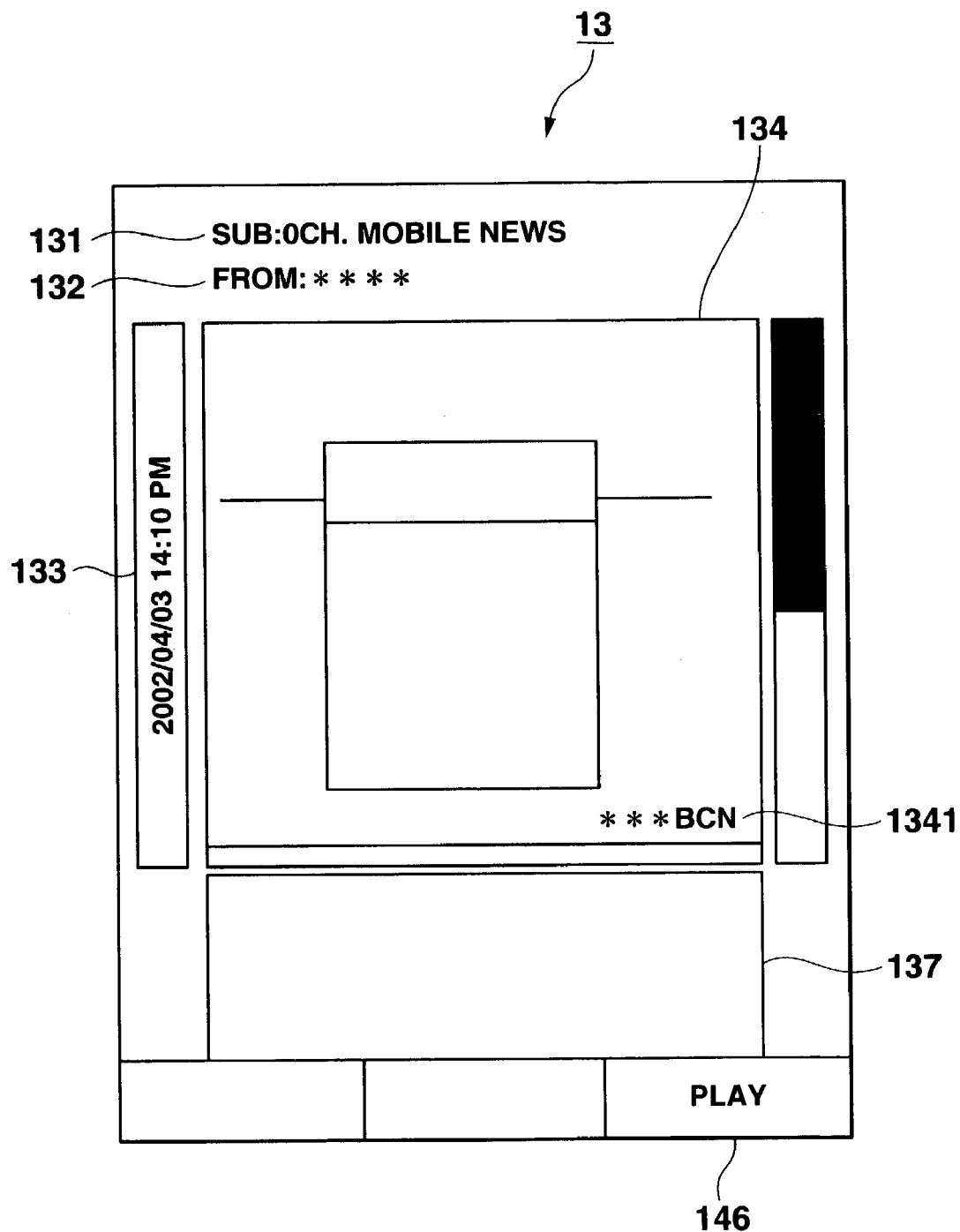
FIG. 29 is a schematic diagram showing the display screen when "e-mail creation/edition" is selected.

FIG. 29 shows the creation screen when the e-mail with the moving picture file acquired from the video distributed in this manner is created. In FIG. 29, the property data (in this display example, channel number and program name) stored in correspondence to this moving picture file in the image memory 23 is displayed as a default display state in the Subject area 131. The name "**" of the e-mail transmitter is displayed in the "From" area 132. The creation date/time "2002/04/03 14:00 PM" of the attached moving picture file is displayed in the date/time display area 133. The selected moving picture is displayed on 128×96 pixels (Sub-QCIF size) in the display area 134, and the broadcast station name "*BCN" is combined as the broadcast information data 1341 at the lower right end thereof. The e-mail text is displayed in the e-mail text display area 137. Further, the display area "PLAY" 146 (corresponding to the operation of the function key 143) for instructing reproduction of the moving picture is displayed at the lowest line of the display screen.

In this manner, according to the second embodiment, since the broadcast information data (channel number, broadcast station name, and program name) is displayed at different positions from the video display screen during broadcast reception in the cellular phone capable of receiving the video distributed through the digital broadcast, the distributed video can be clearly displayed even in the small display screen and recording can be easily performed through a simple operation during the TV reception. When the moving picture file acquired by recording this distributed video is attached and transmitted by the cellular phone, the broadcast information data is combined with the moving picture to be attached so that confirmation whether this moving picture file was broadcasted or the moving picture file is one by which broadcast station (distribution source) and by which program can be performed at the reception side of the e-mail with the moving picture file.

The details of the cellular phone capable of receiving the digital broadcasting are described according to the second embodiment, but the present invention is not limited thereto, and can be applied to a portable electronic device (portable TV, PDA) having an e-mail (message) creation function and a digital broadcasting reception function.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A wireless communication apparatus comprising:
a mail creation unit which creates an electronic mail;
a memory which stores a moving image file;
a reading unit which reads the moving image file stored in the memory while the mail creation unit creates the electronic mail;

a display device comprising an electronic mail display area for displaying the electronic mail created by the mail creation unit and a moving image display area for displaying the moving image file read by the reading unit, while the electronic mail is being created or edited;

a user operable input member for selectively instructing (i) a start of reproduction of the moving image file read by the reading unit, and (ii) pausing of the reproduction;

a guidance display which displays which one of (i) the start of reproduction of the moving image file read by the reading unit and (ii) the pausing of reproduction can be instructed by the user operable input member; and a wireless transmitter which transmits the electronic mail created by the mail creation unit with the moving image file attached to the electronic mail.

2. The communication apparatus according to claim 1, further comprising an image pickup device which captures a moving image, and the captured moving image is stored in the memory as the moving image file.

3. The communication apparatus according to claim 1, further comprising a broadcast receiving device which receives a moving image, and the received moving image is stored in the memory as the moving image file.

4. The communication apparatus according to claim 1, wherein the guidance display displays a first guidance message indicating that the user operable input member is operable to pause the reproduction when the moving image file is being reproduced and displays a second guidance message indicating that the user operable input member is operable to start the reproduction when the reproduction is paused.

5. The communication apparatus according to claim 1, wherein the memory unit stores a plurality of moving image files, and the reading unit comprises a selector to select one of the stored moving image files to be displayed in the moving image display area.

6. The communication apparatus according to claim 1, wherein the guidance display indicates (i) the start of reproduction of the moving image file when the reproduction is paused, and (ii) the pausing of reproduction when the reproduction is occurring.

7. A display method for a wireless communication apparatus that includes a display, a memory that stores a moving image file, and a user operable input member, said method comprising:

creating an electronic mail; reading the moving image file stored in the memory while the electronic mail is created;

displaying the electronic mail in an electronic mail display area of the display, and displaying the read moving image file in a moving image display area of the display, while the electronic mail is being created or edited;

selectively starting reproduction of the read moving image file and pausing the reproduction in accordance with operation of the user operable input member;

displaying guidance as to which one of (i) the start of reproduction of the read moving image file and (ii) the pausing of reproduction can be instructed by the user operable input member; and wirelessly transmitting the electronic mail with the moving image file attached thereto.

8. The method according to claim 7, further comprising: capturing a moving image with an image pickup device; and storing the captured moving image in the memory as the moving image file.

9. The method according to claim 7, further comprising: receiving a moving image via a broadcast receiving device; and storing the received moving image in the memory as the moving image file.

10. The method according to claim 7, wherein said displaying the guidance comprises:

displaying a first guidance message indicating that the user operable input member is operable to pause the reproduction, when the moving image file is being reproduced; and displaying a second guidance message indicating that the user operable input member is operable to start the reproduction, when the reproduction is paused.

11. The method according to claim 7, wherein the memory unit stores a plurality of moving image files, and the method further comprises selecting one of the stored moving image files to be read so as to be displayed in the moving image display area.

12. The method according to claim 7, wherein said displaying the guidance comprises indicating (i) the start of reproduction of the moving image file when the reproduction is paused, and (ii) the pausing of reproduction when the reproduction is occurring.

13. A computer readable storing medium having a program stored thereon that is executable by a computer of a wireless communication apparatus, wherein the communication apparatus includes a display, a memory that stores a moving image file, and a user operable input member, said program being executable by the computer to cause the computer to execute functions comprising:

creating an electronic mail;

reading the moving image file stored in the memory while the electronic mail is created;

displaying the electronic mail in an electronic mail display area of the display, and displaying the read moving image file in a moving image display area of the display, while the electronic mail is being created or edited;

selectively starting reproduction of the read moving image file and pausing the reproduction in accordance with operation of the user operable input member;

displaying guidance as to which one of (i) the start of reproduction of the read moving image file and (ii) the pausing of reproduction can be instructed by the user operable input member; and transmitting the electronic mail with the moving image file attached thereto.

14. The computer readable storing medium according to claim 13, wherein the program is executable by the computer to cause the computer to execute further functions comprising:

capturing a moving image with an image pickup device; and storing the captured moving image in the memory as the moving image file.

15. The computer readable storing medium according to claim 13, wherein the program is executable by the computer to cause the computer to execute further functions comprising:

receiving a moving image via a broadcast receiving device; and storing the received moving image in the memory as the moving image file.

16. The computer readable storing medium according to claim 13, wherein said displaying the guidance comprises:
- displaying a first guidance message indicating that the user operable input member is operable to pause the reproduction, when the moving image file is being reproduced; and
- displaying a second guidance message indicating that the user operable input member is operable to start the reproduction, when the reproduction is paused.

17. The computer readable storing medium according to claim 13, wherein the memory unit stores a plurality of moving image files, and wherein the program is executable by the computer to cause the computer to select one of the stored moving image files to be read so as to be displayed in the moving image display area.

18. The computer readable storing medium according to claim 13, wherein said displaying the guidance comprises indicating (i) the start of reproduction of the moving image file when the reproduction is paused, and (ii) the pausing of reproduction when the reproduction is occurring.

19. A wireless communication apparatus comprising:
- mail creating means for creating an electronic mail;
- storing means for storing a moving image file;
- reading means for reading the moving image file stored in the storing means while the mail creation means creates the electronic mail;
- display means for displaying the electronic mail created by the mail creation means in an electronic mail display area, and for displaying the moving image file read by the reading means in a moving image display area, while the electronic mail is being created or edited;
- user operable input means for selectively instructing (i) a start of reproduction of the moving image file read by the reading unit, and (ii) pausing of the reproduction;
- guidance display means for displaying which one of (i) the start of reproduction of the moving image file read by the reading unit and (ii) the pausing of reproduction can be instructed by the user operable input means; and
- means for wirelessly transmitting the electronic mail created by the mail creation means with the moving image file attached to the electronic mail.

20. The communication apparatus according to claim 19, wherein said displaying the guidance comprises indicating (i) the start of reproduction of the moving image file when the reproduction is paused, and (ii) the pausing of reproduction when the reproduction is occurring.

* * * * *